US011723025B2

(12) United States Patent
Takeda et al.

(10) Patent No.: US 11,723,025 B2
(45) Date of Patent: Aug. 8, 2023

(54) RADIO PDCCH RATE-MATCHING FOR LONG TERM EVOLUTION CELL-SPECIFIC REFERENCE SIGNALS

(71) Applicant: QUALCOMM Incorporated, San Diego, CA (US)

(72) Inventors: Kazuki Takeda, Tokyo (JP); Alberto Rico Alvarino, San Diego, CA (US); Peter Gaal, San Diego, CA (US); Jing Sun, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/332,003

(22) Filed: May 27, 2021

(65) Prior Publication Data

US 2022/0386342 A1 Dec. 1, 2022

(51) Int. Cl.
*H04W 72/12* (2023.01)
*H04W 72/1273* (2023.01)
*H04L 5/00* (2006.01)
*H04W 72/0446* (2023.01)
*H04W 72/50* (2023.01)

(52) U.S. Cl.
CPC ....... *H04W 72/1273* (2013.01); *H04L 5/0051* (2013.01); *H04W 72/0446* (2013.01); *H04W 72/535* (2023.01)

(58) Field of Classification Search
CPC ................. H04L 5/001; H04L 5/0092; H04W 72/1263; H04W 16/14
See application file for complete search history.

(56) References Cited

U.S. PATENT DOCUMENTS

| 2020/0045569 | A1* | 2/2020 | Seo ..................... H04W 72/042 |
| 2020/0177306 | A1* | 6/2020 | Choi ..................... H04L 5/0094 |
| 2020/0220703 | A1* | 7/2020 | Kim ..................... H04L 5/0051 |
| 2020/0382354 | A1* | 12/2020 | Sengupta ................ H04L 5/001 |
| 2022/0312452 | A1* | 9/2022 | Frenne .............. H04W 72/1289 |

FOREIGN PATENT DOCUMENTS

| EP | 4009566 A1 | 6/2022 |
| WO | 2021118192 A1 | 6/2021 |
| WO | 2022077230 A1 | 4/2022 |

OTHER PUBLICATIONS

International Search Report and Written Opinion—PCT/US2022/027923—ISA/EPO—dated Sep. 20, 2022.

(Continued)

*Primary Examiner* — Romani Ohri
(74) *Attorney, Agent, or Firm* — Procopio, Cory, Hargreaves & Savitch

(57) ABSTRACT

Aspects presented herein may enable a base station to map one or more DMRSs to one or more REs of a slot based on the locations of one or more CRSs in the slot and/or based on whether at least one DMRS overlaps with at least one CRS. In one aspect, the base station maps PDCCH DMRS of a first RAT to a CORESET based on whether CRS of a second RAT overlaps at least partially with the CORESET. The base station transmits the PDCCH DMRS mapped to the CORESET.

28 Claims, 24 Drawing Sheets

(56) References Cited

OTHER PUBLICATIONS

Nokia et al., "Extension of the Dynamic Spectrum Sharing (DSS) WID", 3GPP TSG RAN meeting #89, RP-201761, 3rd Generation Partnership Project, Mobile Competence Centre, 650, Route Des Lucioles, F-06921 Sophia-Antipolis Cedex France, vol. TSG RAN, No. e-Meeting, Sep. 14, 2020-Sep. 18, 2020 Sep. 7, 2020, XP051931560, 3 Pages, Section 2, Figures 1b, 1c.
Nokia et al., "Extension of the Dynamic Spectrum Sharing (DSS) WID", 3GPP TSG RAN WG1 #102, R1-2006470, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020 Aug. 7, 2020, XP051918041, 5 Pages, Section 2, Figure 1.

\* cited by examiner

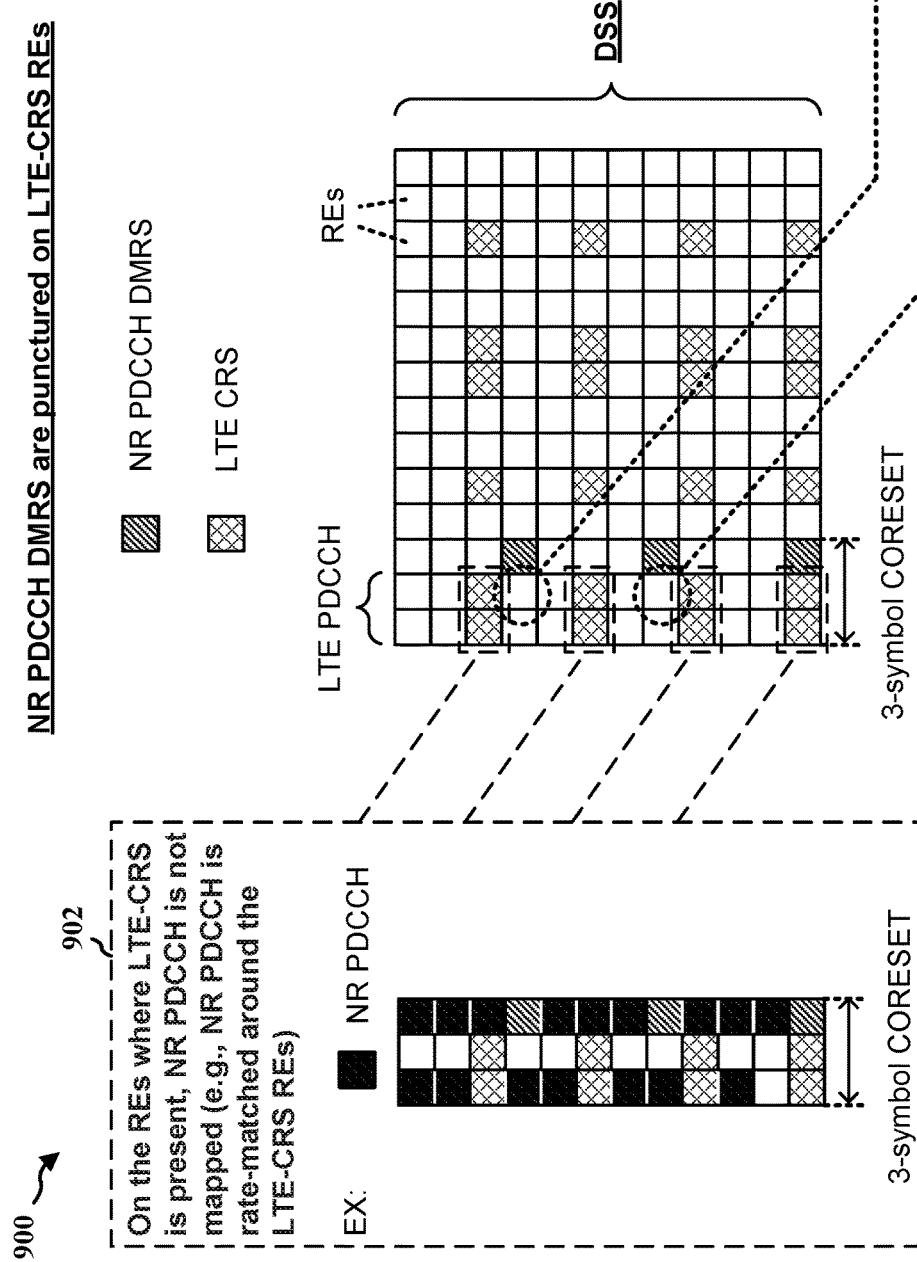
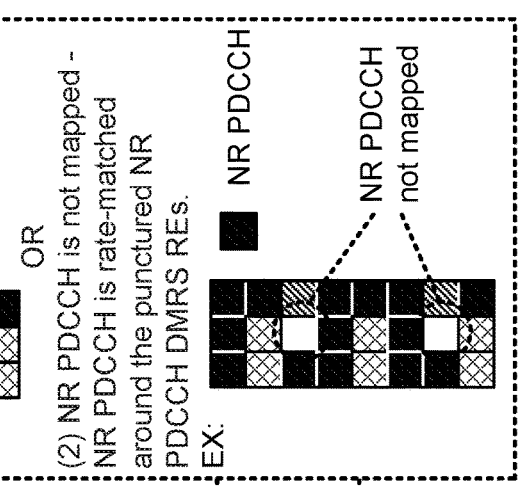
FIG. 9

RADIO PDCCH RATE-MATCHING FOR LONG TERM EVOLUTION CELL-SPECIFIC REFERENCE SIGNALS

TECHNICAL FIELD

The present disclosure relates generally to communication systems, and more particularly, to wireless communication involving demodulation reference signals (DMRS) mapping.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus maps physical downlink control channel (PDCCH) demodulation reference signals (DMRS) of a first radio access technology (RAT) to a control resource set (CORESET) based on whether cell-specific reference signals (CRS) of a second RAT overlaps at least partially with the CORESET. The apparatus transmits the PDCCH DMRS mapped to the CORESET.

In an aspect of the disclosure, a method, a computer-readable medium, and an apparatus are provided. The apparatus receives PDCCH DMRS of a first RAT in a CORESET, where the PDCCH DMRS of the first RAT is mapped based on whether CRS of a second RAT overlaps at least partially with the CORESET. The apparatus measures channel condition based on the received PDCCH DMRS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 9 is a diagram illustrating an example of mapping physical downlink control channel (PDCCH) on resource elements (REs) where DMRS is punctured or CRS is presented in accordance with various aspects of the present disclosure.

DETAILED DESCRIPTION

Figure 1:
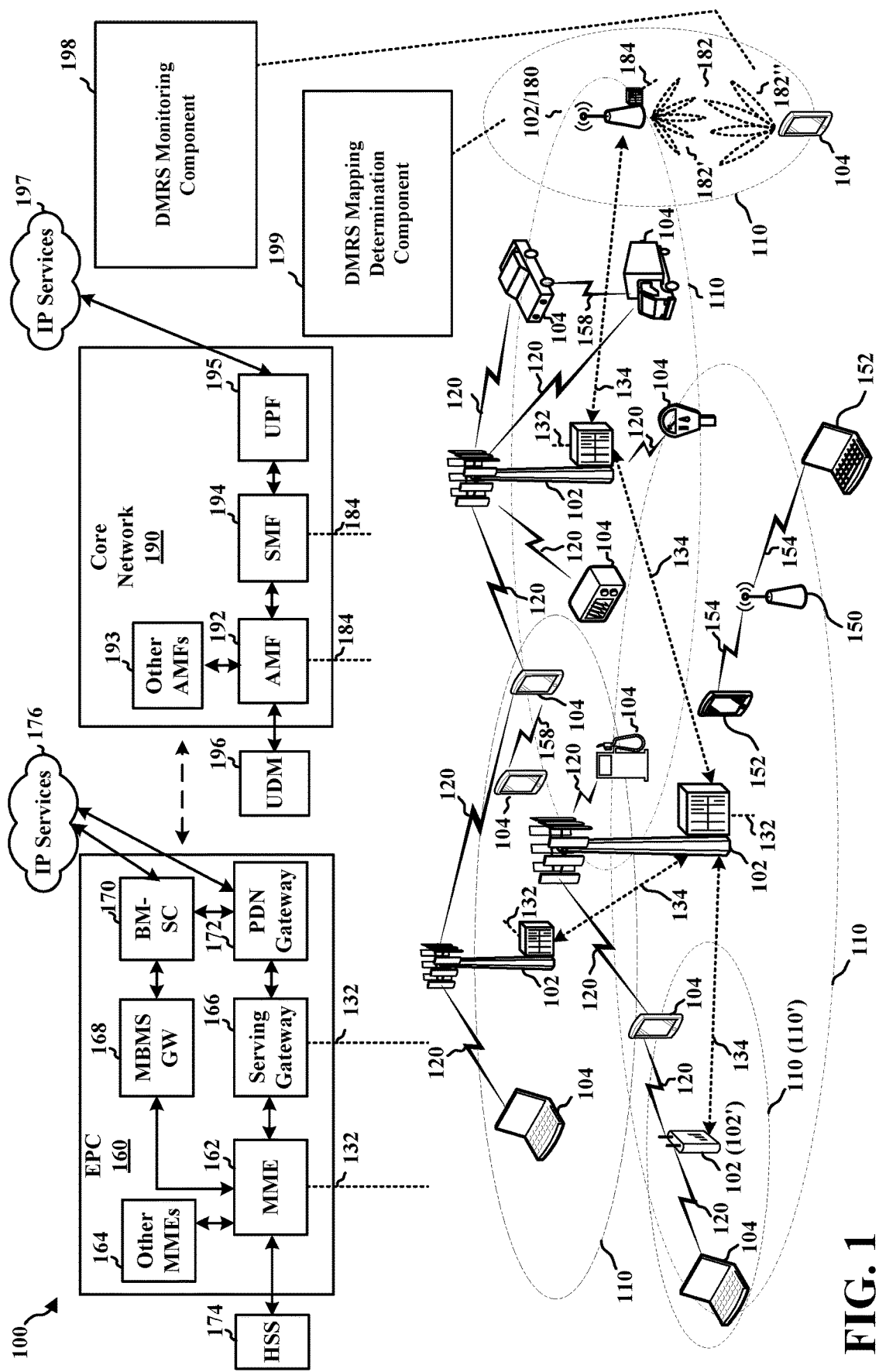
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may enable overhead for control channels and reference signals for slots associated with DSS to be reduced to improve spectral efficiency for DSS operations. Aspects presented herein may enable PDCCH of a first RAT (e.g., NR PDCCH) to overlap (e.g., at least partially) with PDCCH/PDSCH of a second RAT (e.g., LTE PDCCH/PDSCH), where a base station may map reference signals for the first RAT based on a set of rules. For example, an NR base station may map one or more NR PDCCH DMRSs to one or more REs of a slot based on the location/mapping of one or more LTE CRSs in the slot, and the NR base station may transmit the mapping information to a NR UE (or the mapping information may be preconfigured at the NR UE). In response, the NR UE may monitor/receive NR PDCCH DMRSs based at least in part on the mapping information/rules.

In certain aspects, the UE 104 may include a DMRS monitoring component 198 configured to monitor/receive one or more NR PDCCH DMRSs from one or more REs of a slot based on the locations of one or more LTE CRSs in the slot when NR PDCCH is at least partially overlapped with LTE PDCCH in the slot. In one configuration, the DMRS monitoring component 198 may be configured to receive PDCCH DMRS of a first RAT (e.g., 5G NR) in a CORESET, where the PDCCH DMRS of the first RAT is mapped based on whether CRS of a second RAT overlaps at least partially with the CORESET. In such configuration, the DMRS monitoring component 198 may measure channel condition based on the received PDCCH DMRS.

In certain aspects, the base station 102/180 may include a DMRS mapping determination component 199 configured to map one or more NR DMRSs to one or more REs of a slot based on the locations of one or more LTE CRSs in the slot when NR PDCCH is at least partially overlapped with LTE PDCCH in the slot. In one configuration, the DMRS mapping determination component 199 may be configured to map PDCCH DMRS of a first RAT to a CORESET based on whether CRS of a second RAT overlaps at least partially with the CORESET. In such configuration, the DMRS mapping determination component 199 may transmit the PDCCH DMRS mapped to the CORESET.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
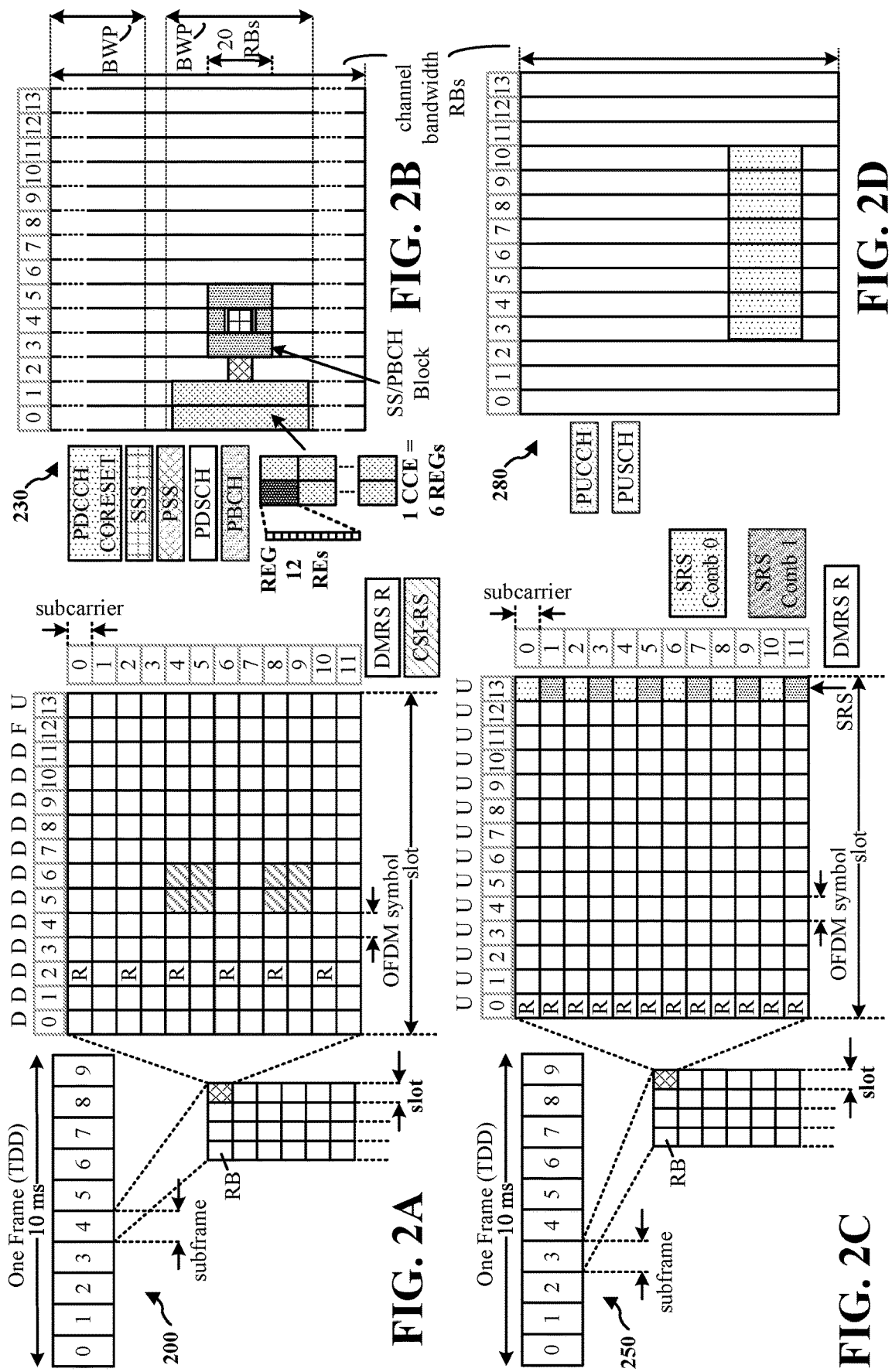
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
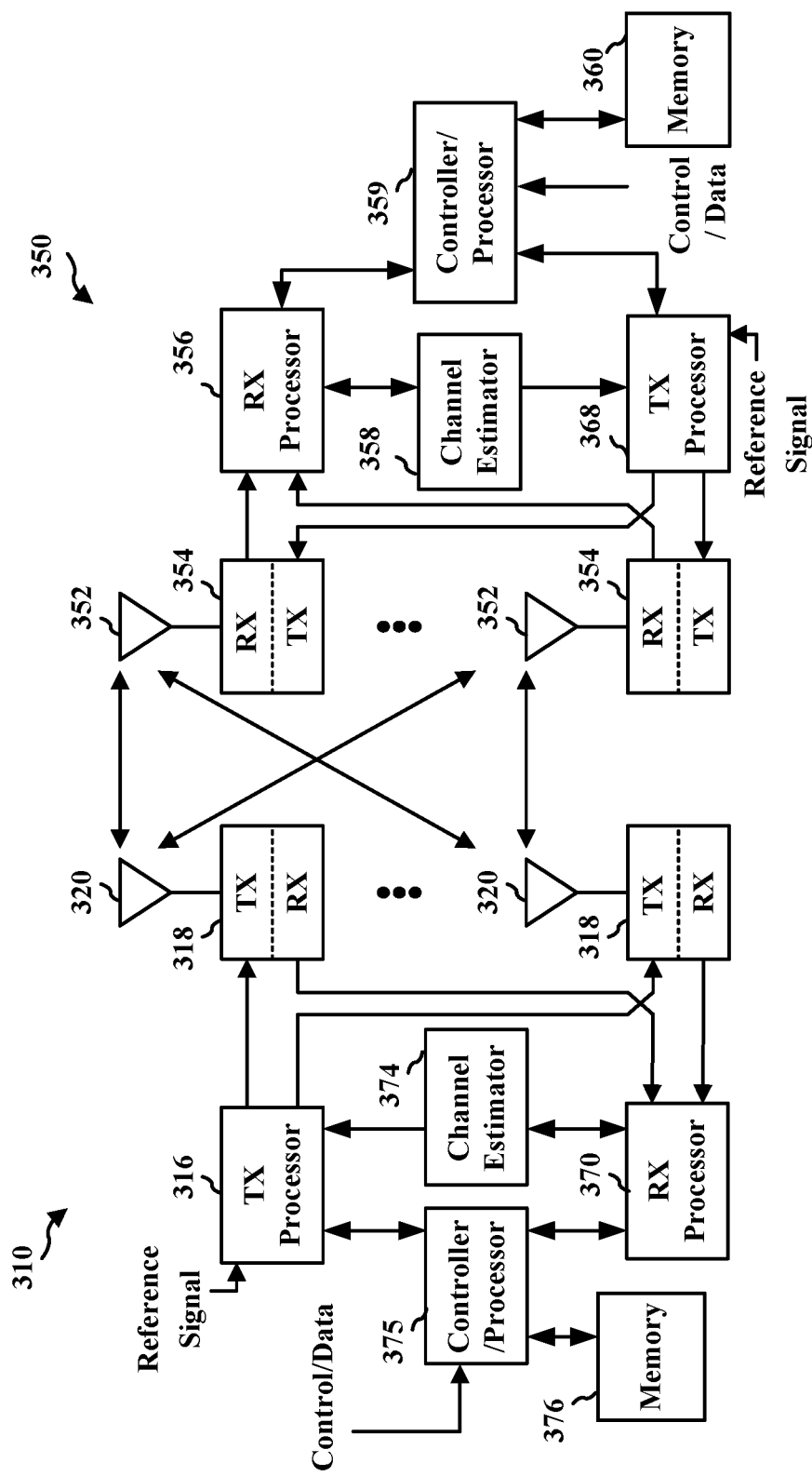
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the DMRS monitoring component 198 of FIG. 1.

At least one of the TX processor 316, the RX processor 370, and the controller/processor 375 may be configured to perform aspects in connection with the DMRS mapping determination component 199 of FIG. 1.

A network may include and operate with more than one type of radio access technology (RAT) (e.g., with more than one type of communication standard), where the network may use different RATs to provide wireless communication services to different users (e.g., to different wireless devices). For example, a network may operate with both 5G New Radio (NR) and 4G Long Term Evolution (LTE) at a same time, where the network may provide wireless communication services to wireless devices that support 5G NR and also to wireless devices that support 4G LTE. By operating with both 5G NR and 4G LTE, the network may provide backward compatibility for wireless devices that support 4G LTE but not 5G NR while extending/transitioning its telecommunication services to 5G NR.

When a network is operating with multiple RATs, the network may apply dynamic spectrum sharing (DSS) to the transmissions from the multiple RATs to provide a more efficient use of radio resources. DSS is a mechanism that may enable transmissions from different RATs to use a same frequency band. For example, DSS may enable a parallel use of 4G LTE and 5G NR in a same frequency band of a network, where the network may divide available bandwidth(s) dynamically based on usage/demand for 5G NR and 4G LTE services.

Figure 4:
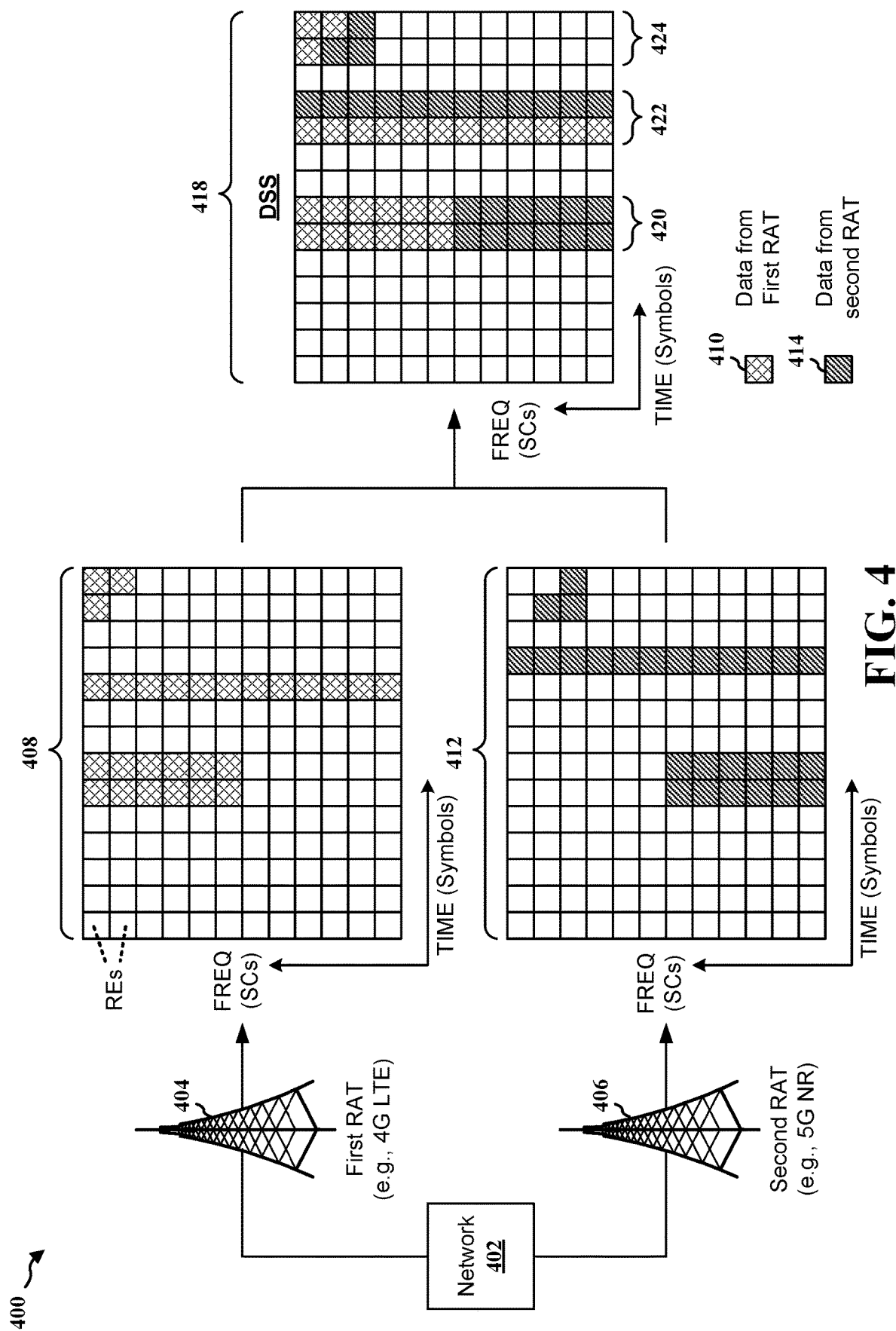
FIG. 4 is a diagram illustrating an example of DSS in accordance with various aspects of the present disclosure.

FIG. 4 is a diagram 400 illustrating an example of DSS in accordance with various aspects of the present disclosure. A network 402 may be operating with a first RAT (e.g., 4G LTE) and a second RAT (5G NR), where the network may transmit transmissions (e.g., data) for wireless devices supporting the first RAT from a first base station 404 (e.g., a 4G LTE base station), and the network may transmit transmissions for wireless devices supporting the second RAT from a second base station 406 (e.g., a 4G LTE base station). For example, as shown at 408, the first base station 404 may transmit data 410 to wireless devices supporting the first RAT (e.g., 4G LTE UEs) using a first set of resources of a slot/subframe, and as shown at 412, the second base station 406 may also transmit data to wireless devices supporting the second RAT (e.g., 5G NR UEs) using a second set of resources (e.g., non-overlapping resources) of the slot/subframe. As such, as shown at 418, based on the DSS, the first base station 404 and the base station 406 may transmit data using same time or frequency resources in a slot/subframe. In one example, as shown at 420, the first base station 404 and the base station 406 may transmit data using same time resources in a slot/subframe based on frequency division multiplexing (FDM), e.g., data from the first base station 404 and the base station 406 are being transmitted at the same time but using different frequency bands in the slot/subframe. In another example, as shown at 422, the first base station 404 and the base station 406 may transmit data using same frequency resources in a slot/subframe based on time division multiplexing (TDM), e.g., data from the first base station 404 and the base station 406 are transmitted using a same frequency band but at different times (e.g., symbols). In another example, as shown at 424, the first base station 404 and the base station 406 may transmit data based on a combination of both FDM and TDM in a slot/subframe.

Under DSS, a UE may be configured to monitor and receive (e.g., decode) data/signals transmitted from the RAT it supports. For example, if a network supports both 5G NR and 4G LTE, the network may be configured to use an NR base station to transmit NR signals and use an LTE base station to transmit LTE signals on a same carrier. Under such configuration, an NR UE (e.g., a UE that supports 5G NR) may be configured to receive/monitor the NR signals but not the LTE signals, and an LTE UE (e.g., a UE that supports 4G LTE) may be configured to receive/monitor the LTE signals but not the NR signals, etc.

Figure 5:
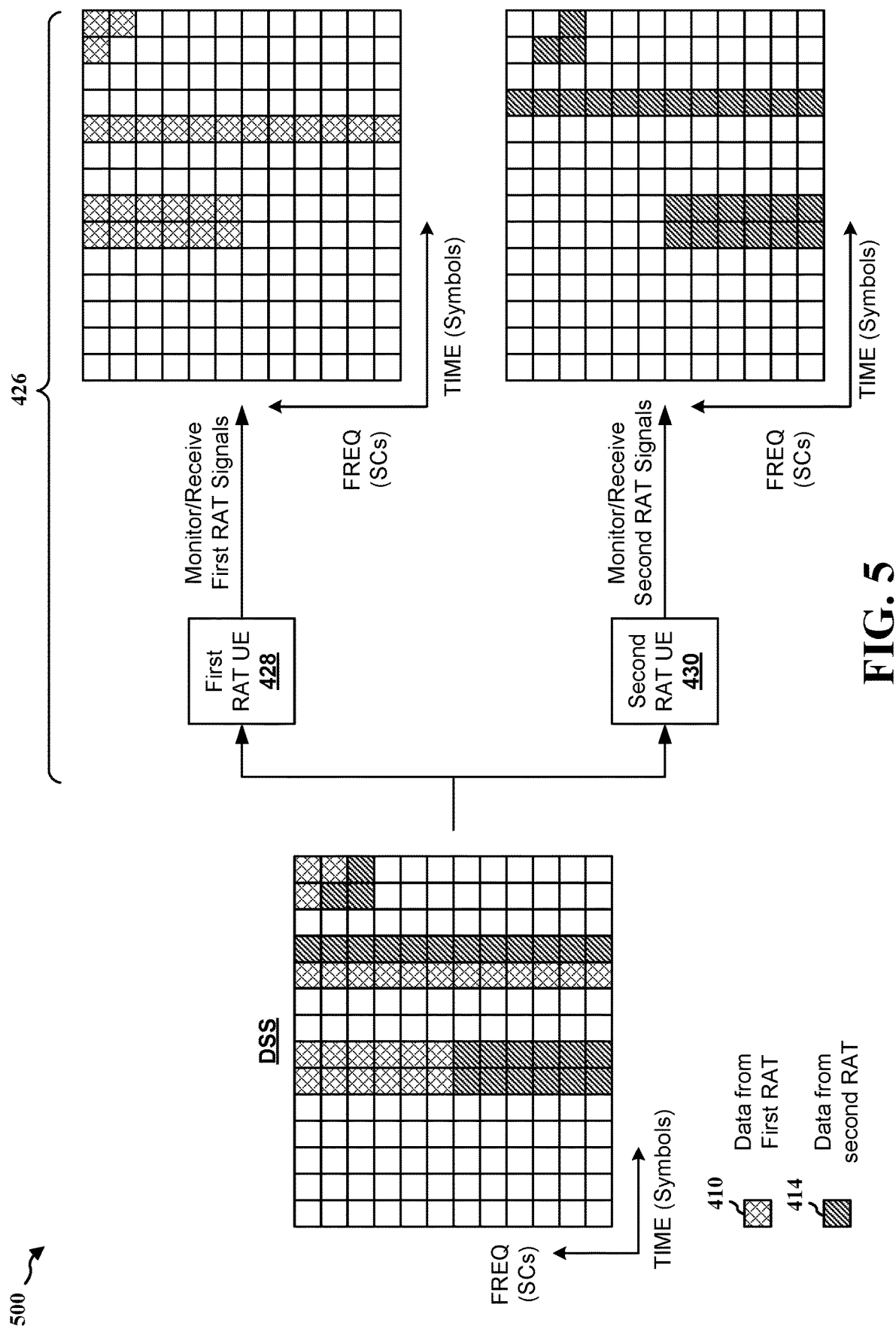
FIG. 5 is a diagram illustrating an example of UEs receiving data under DSS in accordance with various aspects of the present disclosure.

FIG. 5 is a diagram 500 illustrating an example of UEs receiving data under DSS in accordance with various aspects of the present disclosure. As shown at 426, a first UE 428 (e.g., an LTE UE) may support the first RAT, but may not support the second RAT. Thus, the first UE 428 may be configured to monitor/decode first RAT signals (e.g., data 410 transmitted from the first base station 404) but not the second RAT signals. Similarly, a second UE 430 (e.g., an NR UE) may support the second RAT, but may not support the first RAT. Thus, the second UE 430 may be configured to monitor/decode second RAT signals (e.g., data 414 from the second base station 406) but not the first RAT signals. In some examples, a base station may indicate to a UE time and/or frequency resources that are configured for different RATs, such that the UE may monitor for time and/or frequency resources that correspond to the RAT is supports. For example, an NR base station (e.g., the base station 406) may indicate to an NR UE (e.g., the UE 430) of where the NR signals (e.g., the data 414) are mapped/allocated, e.g., via a higher-layer message such as radio resource control (RRC) signaling. Based on the indication, the NR UE may monitor for NR signals in a slot/subframe associated with DSS, and may skip monitoring non-NR signals in the slot/subframe. In other examples, a UE may not be aware that a transmission received/monitored is based on DSS. For example, an LTE UE may not have the capabilities to detect or know the presence of NR base station and/or NR ULE on the same carrier as the LTE UE may not support the NR. Thus, an LTE base station (e.g., the base station 404) may not indicate to an LTE UE (e.g., the UE 428) of where the LTE signals (e.g., the data 410) are allocated.

While DSS may provide a more efficient and dynamic use of radio resources, such as for UEs supporting different RATs, DSS operations may increase overhead signaling for control channels (e.g., physical downlink control channel (PDCCH)) and/or reference signals compared to non-DSS operations.

Figure 6:
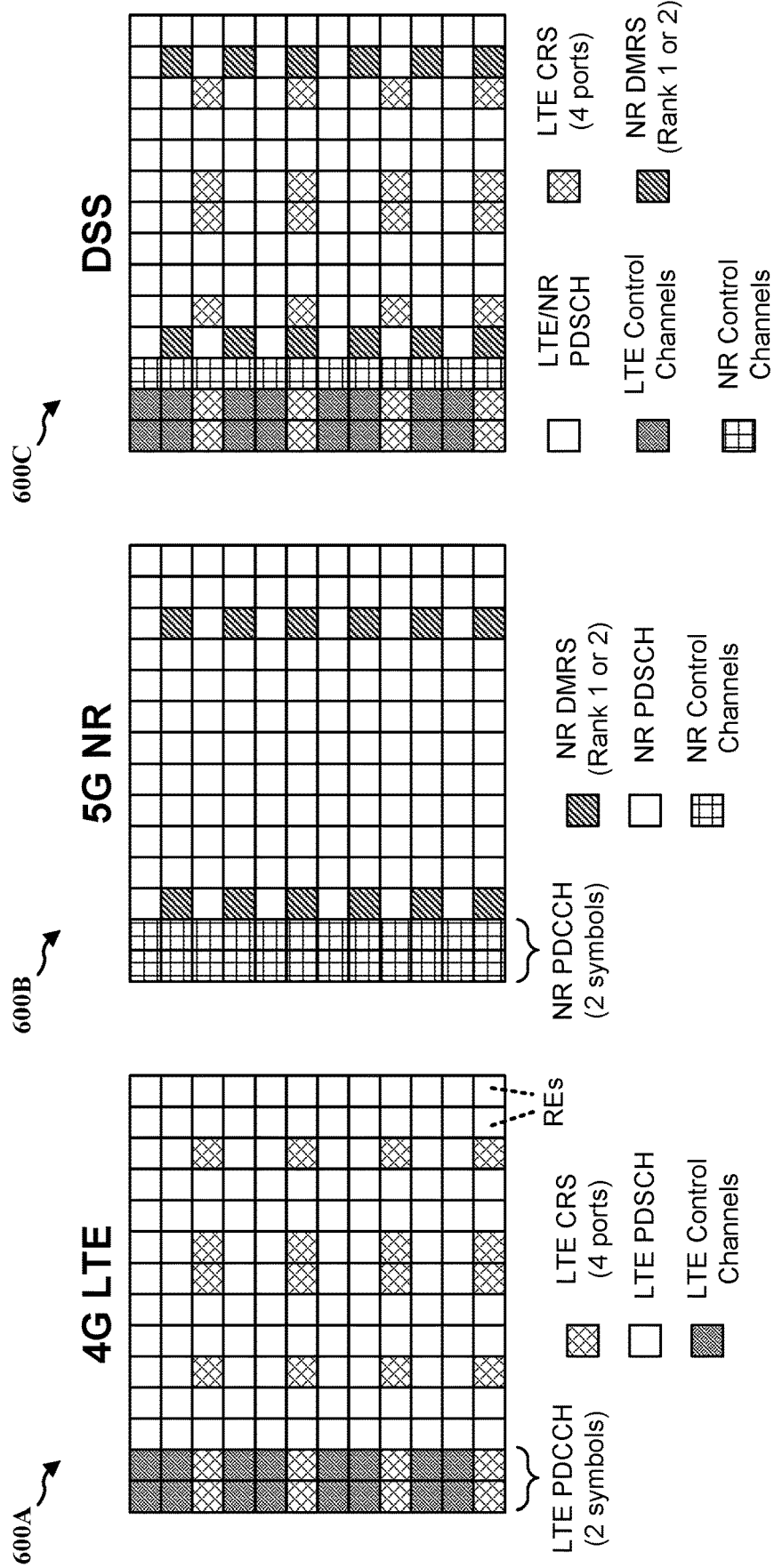
FIGS. 6A, 6B, and 6C are diagrams illustrating examples of control signals and reference signals overhead for 4G Long Term Evolution (LTE), 5G New Radio (NR), and dynamic spectrum sharing (DSS), respectively, in accordance with various aspects of the present disclosure.

FIGS. 6A, 6B, and 6C are diagrams 600A, 600B, and 600C illustrating examples of control signals and reference signals overhead for 4G LTE, 5G NR, and DSS, respectively, in accordance with various aspects of the present disclosure. As shown by the diagram 600A, a slot for 4G LTE may be configured with a PDCCH that occupies two (2) symbols and multiple cell-specific reference signals (CRSs), which may provide approximately 128 available resource elements (REs) for transmitting data (e.g., for physical downlink shared channel (PDSCH)). Similarly, as shown by the diagram 600B, a slot for 5G NR may be configured with a PDCCH that occupies two (2) symbols and multiple demodulation reference signals (DMRSs), which may provide approximately 132 available REs for transmitting data. On the other hand, as shown by the diagram 600C, a slot for DSS may be configured with LTE/NR PDCCH that occupies three (3) symbols and multiple LTE CRSs and NR DMRSs, which may provide approximately 92 available REs for transmitting data. Thus, the available REs in a slot for DSS may be much less than a 4G LTE slot and/or a 5G NR slot (e.g., more than 10% less). As such, the efficiency for DSS operations may be reduced when a higher number of control channels and/or reference signals (e.g., CRS and DMRS) is configured for slots associated with DSS.

Aspects presented herein may enable overhead for control channels and reference signals for slots associated with DSS to be reduced to improve spectral efficiency for DSS operations. Aspects presented herein may enable PDCCH of a first RAT (e.g., NR PDCCH) to overlap (e.g., at least partially) with PDCCH/PDSCH of a second RAT (e.g., LTE PDCCH/PDSCH), where a base station may map reference signals for one of the RATs based on a set of rules (e.g., based on reference signals mapped by another base station). For example, an NR base station may be configured to map one or more NR DMRSs to one or more REs of a slot for DSS based on the locations of LTE CRSs in the slot for DSS, and the NR base station may transmit the mapping information to a NR UE. In response, the NR UE may monitor/receive NR DMRSs based on the mapping information.

In one aspect of the present disclosure, for a transmission that is associated with DSS, a base station may be configured to map DMRS(s) (e.g., NR PDCCH DMRS) on symbol(s) where CRS(s) (e.g., LTE CRS) is not present. In other words, for symbol(s) where at least one RE of the DMRS(s) is to be punctured, the DMRS may not be allocated in these symbol(s).

Figure 7:
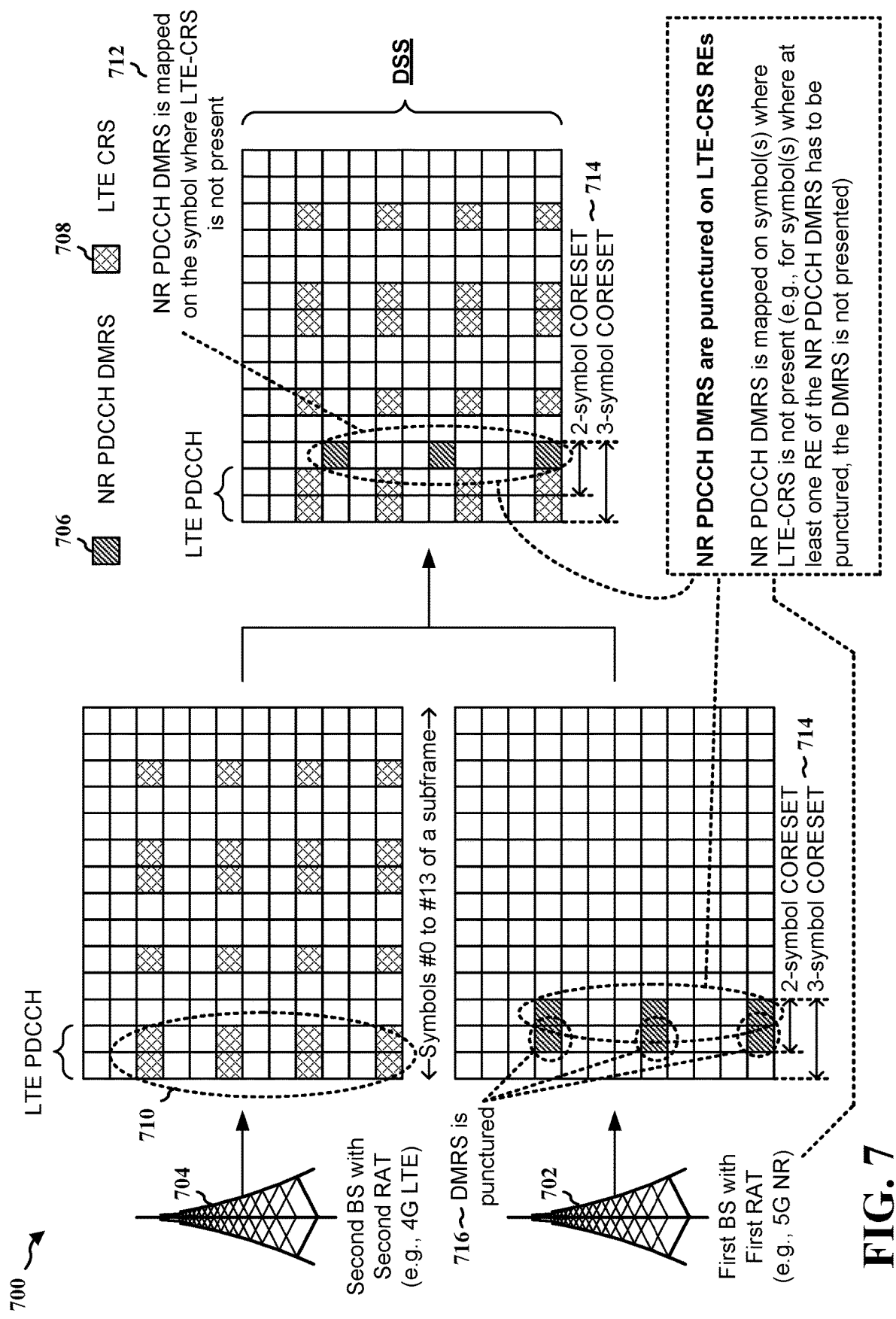
FIG. 7 is a diagram illustrating an example of a base station mapping demodulation reference signal (DMRS) on symbol(s) where cell-specific reference signal (CRS) is not present during a DSS operation in accordance with various aspects of the present disclosure.

FIG. 7 is a diagram 700 illustrating an example of a base station mapping DMRS on symbol(s) where CRS is not present during a DSS operation in accordance with various aspects of the present disclosure. A first base station 702 that is associated with a first RAT (e.g., a 5G NR base station) may transmit a first PDCCH (e.g., a 2-symbol CORESET, a 3-symbol CORESET, an NR PDCCH, etc.) that may overlap with a second PDCCH (e.g., a 1 to 3 symbol(s) LTE PDCCH) transmitted by a second base station 704 that is associated with a second RAT (e.g., a 4G LTE base station).

In one example, when the second base station 704 maps one or more CRSs 708 on the second PDCCH, such as shown at 710, and the second PDCCH overlaps with the first PDCCH (or CORESET associated with the second PDCCH) at least in part, the first base station 702 may be configured to map one or more DMRSs 706 on symbol(s) of the first PDCCH where CRS 708 is not present. For example, as shown at 710 and 712, as the second PDCCH may occupy the first two symbols (e.g., symbols #0 and #1) and both symbols are mapped with at least one CRS 708 (e.g., at least one RE of the symbol is allocated with a CRS 708), if the first PDCCH is a 2-symbol CORESET that occupies the second symbol and the third symbol (e.g., symbols #1 and #2) or a 3-symbol CORESET that occupies the first three symbols (e.g., symbols #0 to #2) such as shown at 714, the first base station 702 may map one or more DMRSs 706 on the third symbol (e.g., symbol #2) for its PDCCH/CORESET. However, the first base station 702 may not map DMRS 706 on the first two symbols (e.g., symbols #0 and #1) as at least one CRS 708 is mapped on each symbol of the first two symbols. In other words, for symbol(s) where at least one RE of the DMRS is to be punctured, the DMRS may not be mapped to those symbol(s). In one example, as shown at 716, DMRSs that are not mapped may be punctured (e.g., dropped or deleted) by the first base station 1002). While the example in FIG. 7 shows an NR PDCCH/CORESET overlapping with an LTE PDCCH, the NR PDCCH may also not overlap with an LTE PDCCH. For example, the NR PDCCH/CORESET may overlap with CRS mapped on LTE PDSCH, and the first base station 702 may apply the same mapping rule.

In one example, information/rule regarding the mapping of the DMRS (e.g., rules on how DMRS is to be mapped when DMRS overlaps with CRS (or when PDCCHs of different RATs are at least partially overlapped) may be indicated to a UE (e.g., via a higher-layer message such as RRC signaling by a base station) and/or preconfigured at a UE. Thus, based on the indication and/or the pre-configuration, the UE may monitor/receive the DMRS based on the mapping information/rule, where the UE may perform channel estimation based on the received DMRS.

Figure 8:
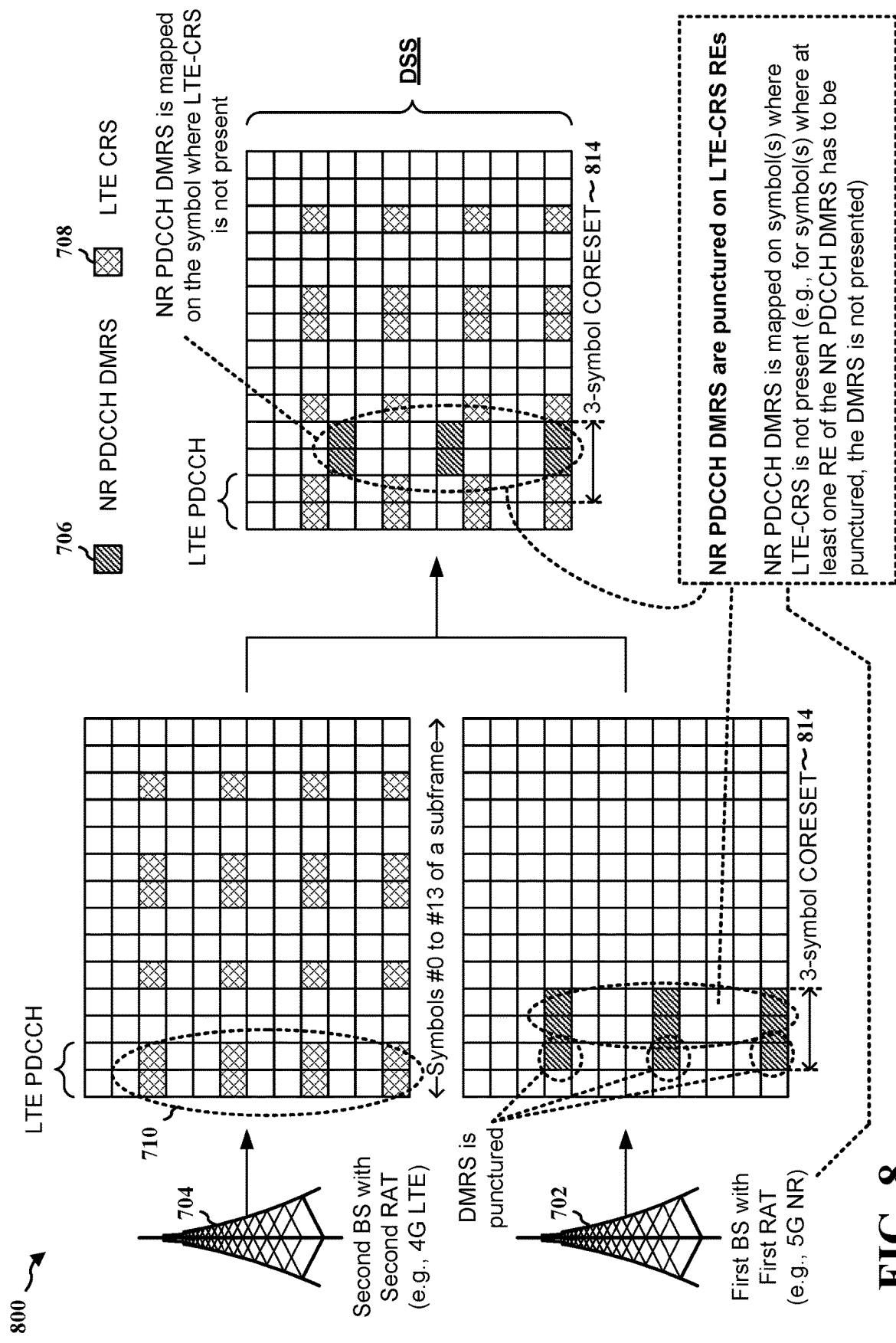
FIG. 8 is a diagram illustrating an example of the base station mapping DMRS on symbol(s) where CRS is not present during a DSS operation in accordance with various aspects of the present disclosure.

FIG. 8 is a diagram 800 illustrating another example of the base station mapping DMRS on symbol(s) where CRS is not present during a DSS operation in accordance with various aspects of the present disclosure. In this example, the first PDCCH may be a 3-symbol CORESET that occupies the second symbol to the fourth symbol (e.g., symbols #1 to #3) such as shown at 814. Thus, as the second symbol (e.g., symbol #1) is mapped with at least one CRS 708, the first base station 702 may map one or more DMRSs 706 on the third symbol (e.g., symbol #2) and/or the fourth symbol (e.g., symbol #3) for its PDCCH/CORESET. However, the first base station 702 may not map DMRS 706 on the second symbol (e.g., symbols #1). Similarly, the first PDCCH may also not overlap with the second PDCCH. For example, the NR PDCCH/CORESET may overlap with CRS mapped on PDSCH that correspond to the second PDCCH (e.g., LTE PDSCH), and the first base station 702 may apply the same mapping rule when at least one DMRS overlaps with CRS in the PDSCH.

FIG. 9 is a diagram 900 illustrating an example of mapping PDCCH on REs where DMRS is punctured or CRS is presented in accordance with various aspects of the present disclosure. In one example, when the first base station 702 is configured to map DMRS on symbol(s) where CRS is not present and to puncture DMRS that overlaps CRS, the first base station 702 may not map first PDCCH on the REs where CRS is present (e.g., the first PDCCH may be rate-matched around the CRS REs). For example, as shown at 902, on the REs where LTE-CRS is present, NR PDCCH may not be mapped (e.g., NR PDCCH is rate-matched around the LTE-CRS REs). On the other hand, for the REs where the DMRS is punctured but CRS is not present, the first base station 702 may be configured to map PDCCH on these REs, or alternatively, the first base station 702 may be configured to not map PDCCH on these REs. For example, as shown at 904, on the REs where the NR PDCCH DMRS is punctured but LTE-CRS is not present, the first base station 702 may map NR PDCCH on these REs (e.g., NR PDCCH is not rate-matched around the punctured NR PDCCH DMRS REs). Alternatively, the first base station 702 may not map NR PDCCH on these REs (e.g., NR PDCCH is rate-matched around the punctured NR PDCCH DMRS REs). Similarly, information/rule regarding the mapping of the DMRS may be indicated to a UE (e.g., via a higher-layer message such as RRC signaling by a base station) and/or preconfigured at a UE. Thus, based on the indication and/or the pre-configuration, the UE may monitor/receive the DMRS based on the mapping, where the UE may perform channel estimation based on the received DMRS.

In another aspect of the present disclosure, for transmission that is associated with DSS, a base station may be configured to map DMRS(s) (e.g., NR PDCCH DMRS) on RE(s) where CRS(s) (e.g., LTE CRS) is not present. Thus, the DMRS may be mapped with the CRS on a same symbol if they do not overlap.

Figure 10:
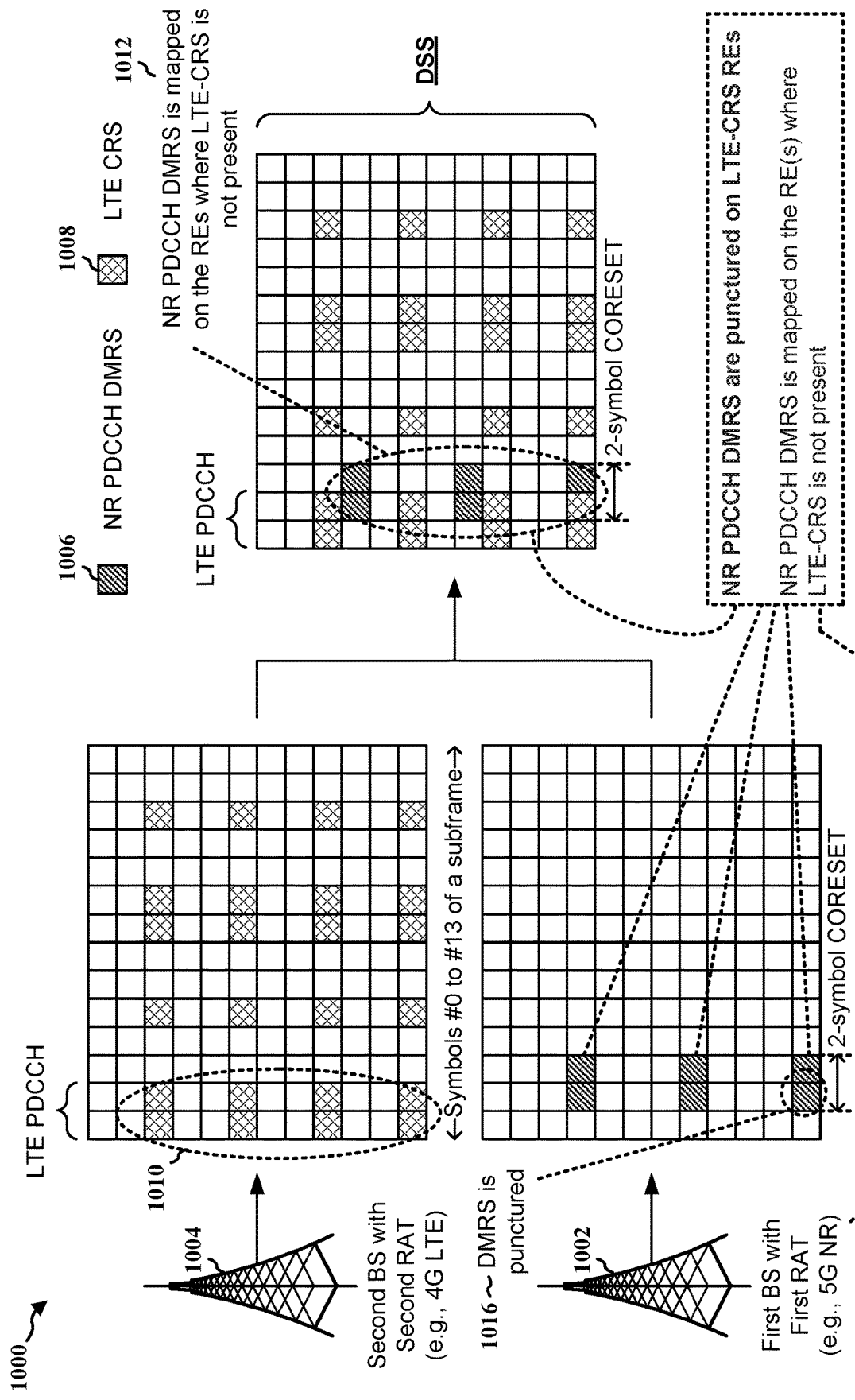
FIG. 10 is a diagram illustrating an example of a base station mapping DMRS on RE(s) where CRS is not presented during a DSS operation in accordance with various aspects of the present disclosure.
Figure 11:
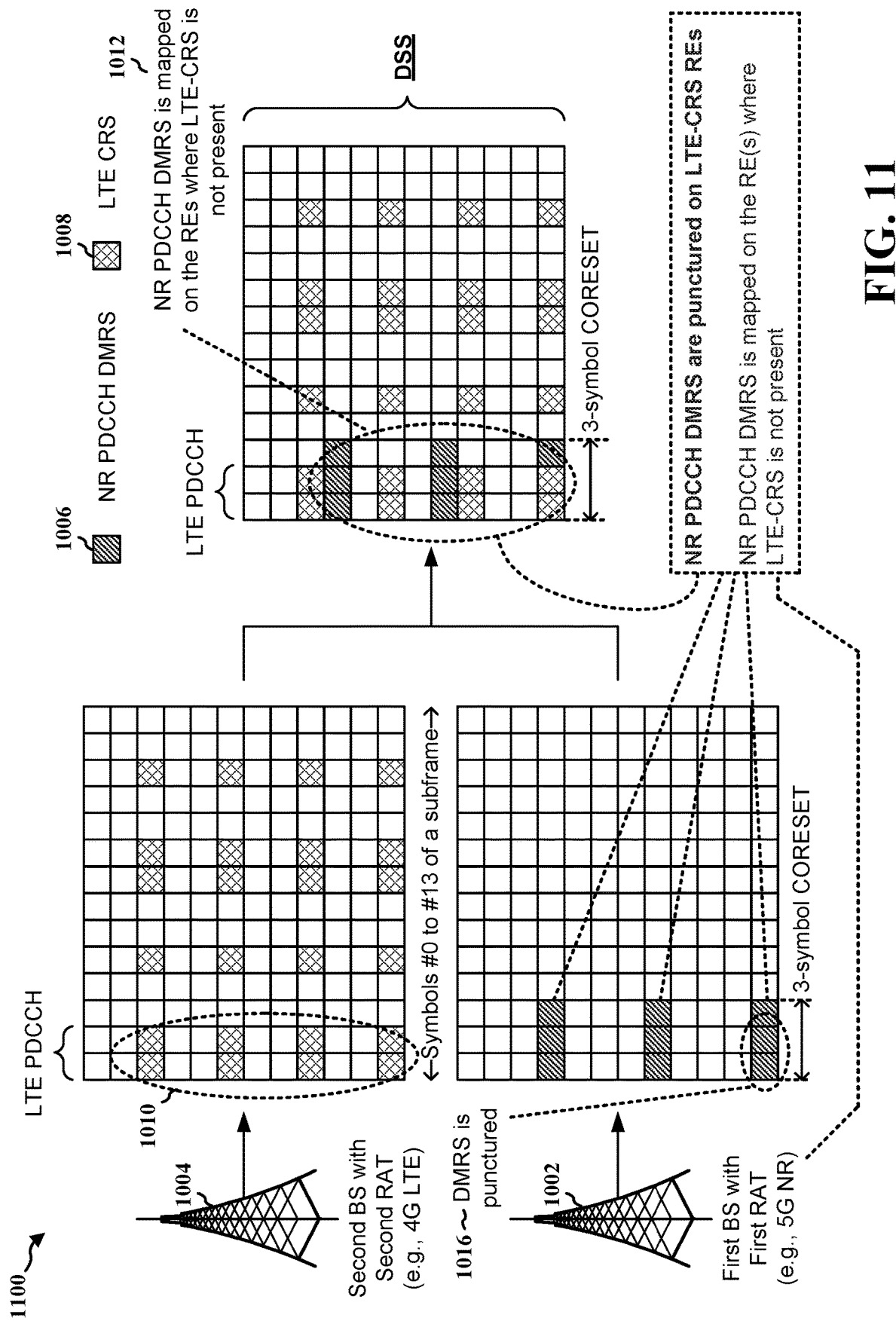
FIG. 11 is a diagram illustrating an example of a base station mapping DMRS on RE(s) where CRS is not presented during a DSS operation in accordance with various aspects of the present disclosure.
Figure 12:
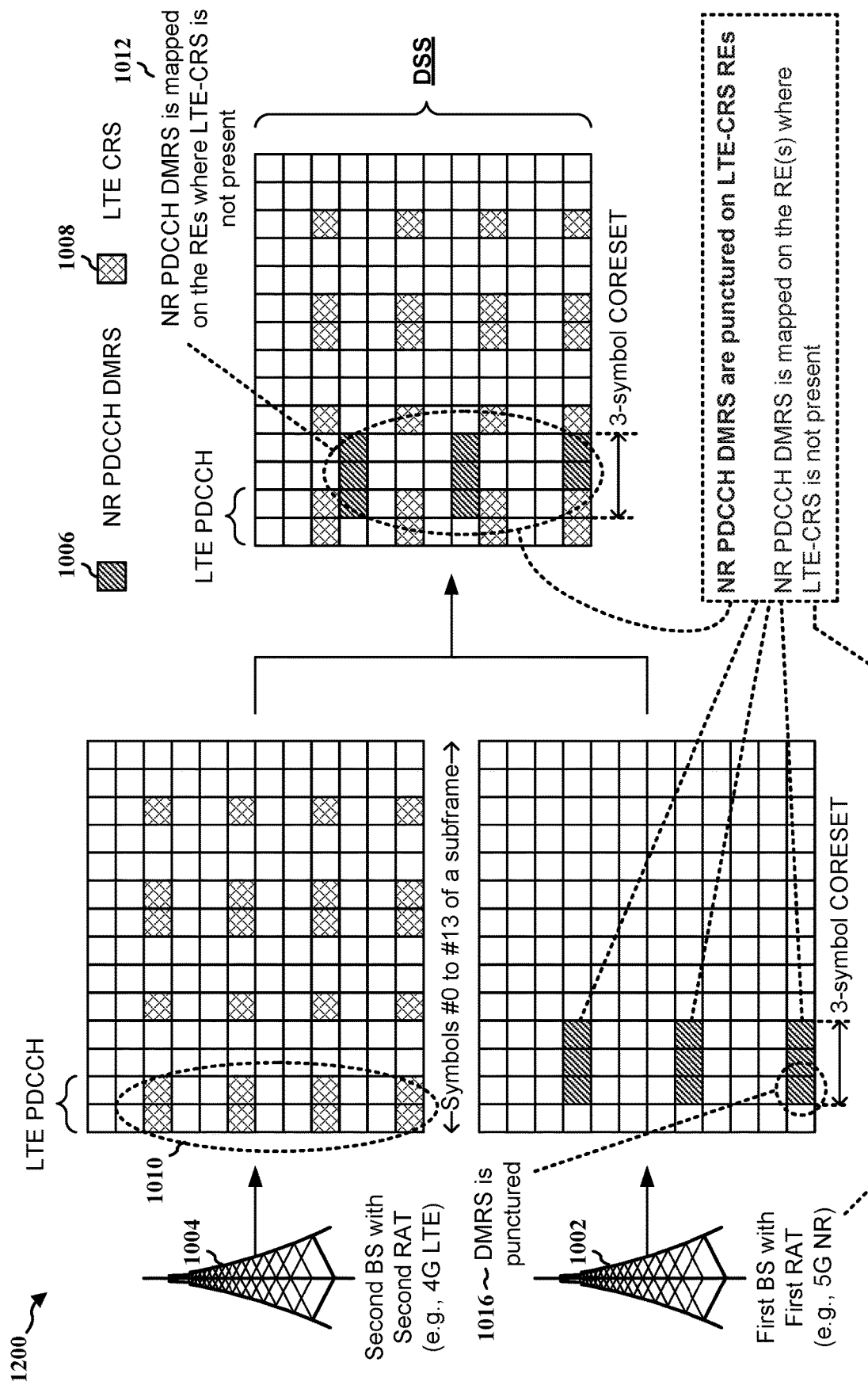
FIG. 12 is a diagram illustrating an example of a base station mapping DMRS on RE(s) where CRS is not presented during a DSS operation in accordance with various aspects of the present disclosure.

FIGS. 10, 11, and 12, are diagrams 1000, 1100, and 1200, respectively, illustrating examples of a base station mapping DMRS on RE(s) where CRS is not presented during a DSS operation in accordance with various aspects of the present disclosure. A first base station 1002 that is associated with a first RAT (e.g., a 5G NR base station) may transmit a first PDCCH (e.g., a 2-symbol CORESET, a 3-symbol CORESET, an NR PDCCH, etc.) that overlaps with a second PDCCH (e.g., a 1 to 3 symbol(s) LTE PDCCH) and/or a PDSCH corresponding to the second PDCCH transmitted by a second base station 1004 that is associated with a second RAT (e.g., a 4G LTE base station).

In one example, when the second base station 1004 maps one or more CRSs 1008 on the second PDCCH and/or its corresponding PDSCH, such as shown at 1010, and the second PDCCH and/or its corresponding PDSCH overlaps with the first PDCCH (or CORESET associated with the second PDCCH) at least in part, the first base station 1002 may be configured to map one or more DMRSs 1006 on RE(s) of the first PDCCH where CRS 1008 is not present. For example, as shown at 1010 and 1012, the second PDCCH may occupy the first two symbols (e.g., symbols #0 and #1) and both symbols may be mapped with multiple CRSs 1008. If the first PDCCH is a 2-symbol CORESET that occupies two symbols (e.g., symbols #1 and #2 as shown by the diagram 1000 of FIG. 10) or a 3-symbol CORESET that occupies three symbols (e.g., symbols #0 to #2 as shown by the diagram 1100 of FIG. 11 or symbols #1 to #3 as shown by the diagram 1200 of FIG. 12, etc.), the first base station 1002 may map one or more DMRSs 1006 on REs that are not mapped with CRS 1008. However, the first base station 1002 may not map DMRS 1006 on the RE(s) that is mapped with CRS 1008. In one example, as shown at 1016, for DMRSs that are not mapped (e.g., DMRS that overlaps with CRS), the DMRS may be punctured by the first base station 1002. Similarly, information/rule regarding the mapping of the DMRS may be indicated to a UE (e.g., via a higher-layer message such as RRC signaling by a base station) and/or preconfigured at a UE. Thus, based on the indication and/or the pre-configuration, the UE may monitor/receive the DMRS based on the mapping, where the UE may perform channel estimation based on the received DMRS. While examples in FIGS. 10 to 12 show an NR PDCCH/CORESET overlapping with an LTE PDCCH, the NR PDCCH may also not overlap with an LTE PDCCH. For example, the NR PDCCH/CORESET may overlap with CRS mapped on LTE PDSCH, and the first base station 1002 may follow/apply the same mapping rule.

In another aspect of the present disclosure, for transmission that is associated with DSS, a base station may be configured to map DMRS(s) (e.g., NR PDCCH DMRS) in a pattern/way that DMRS REs are equal-distant in frequency-domain and not colliding with CRS.

Figure 13:
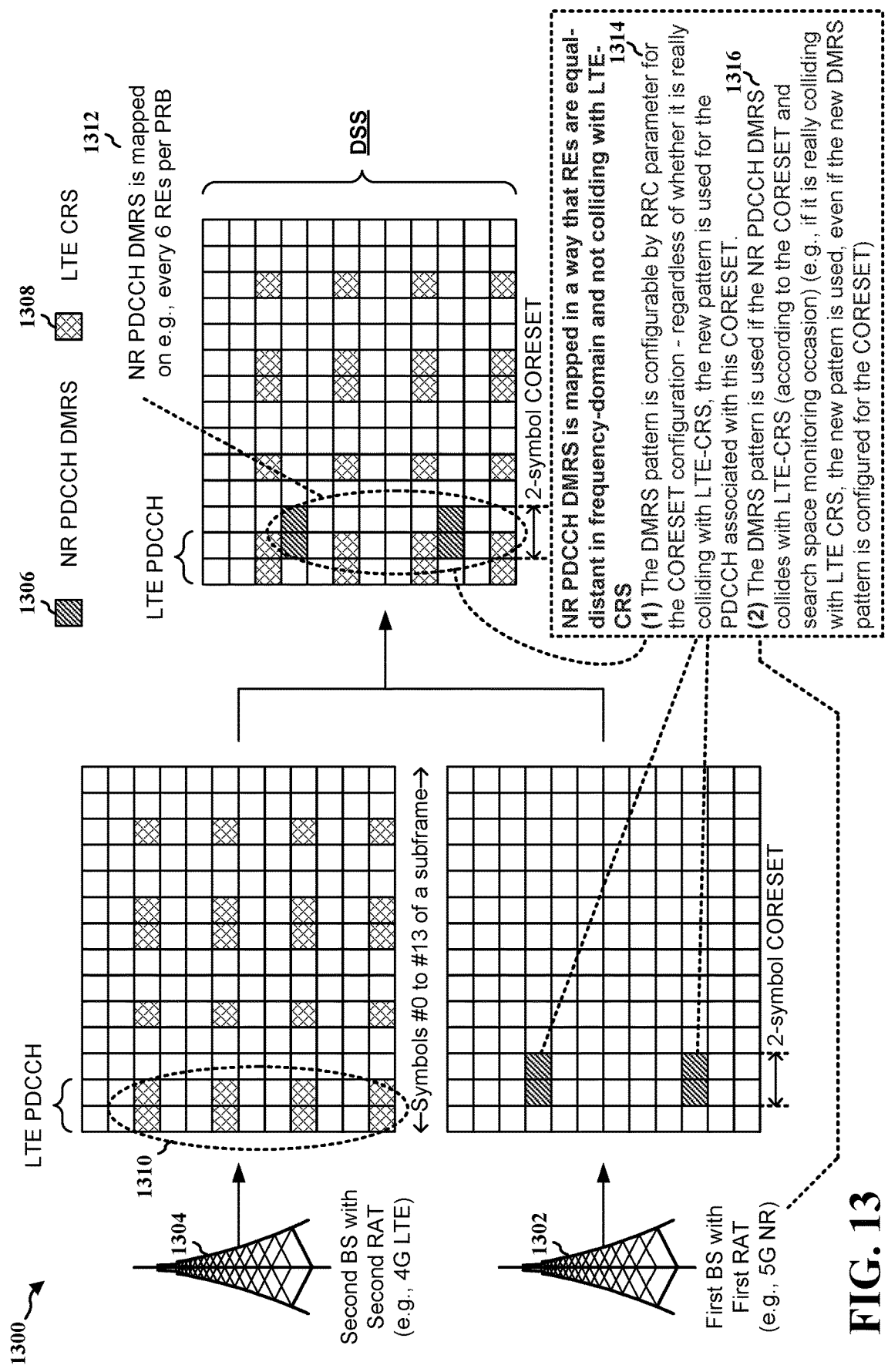
FIG. 13 is a diagram illustrating an example of a base station mapping DMRS on REs that are equal-distant in frequency-domain and not colliding with CRS during a DSS operation in accordance with various aspects of the present disclosure.

FIG. 13 is a diagram 1300 illustrating an example of a base station mapping DMRS on REs that are equal-distant in frequency-domain and not colliding with CRS during a DSS operation in accordance with various aspects of the present disclosure. A first base station 1302 that is associated with a first RAT (e.g., a 5G NR base station) may transmit a first PDCCH (e.g., a 2-symbol CORESET, a 3-symbol CORESET, an NR PDCCH, etc.) that overlaps with a second PDCCH (e.g., a 1 to 3 symbol(s) LTE PDCCH) and/or PDSCH corresponding to the second PDCCH (e.g., LTE PDSCH) transmitted by a second base station 1304 that is associated with a second RAT (e.g., a 4G LTE base station).

In one example, when the second base station 1304 maps one or more CRSs 1308 on the second PDCCH and/or its corresponding PDSCH, such as shown at 1310, and the second PDCCH overlaps with the first PDCCH (or CORESET associated with the second PDCCH) at least in part, the first base station 1302 may be configured to map one or more DMRSs 1306 on RE(s) of the first PDCCH based on a DMRS pattern provides DMRS with equal-distant in frequency-domain and not colliding with CRS 1308. For example, as shown at 1310 and 1312, the second PDCCH may occupy the first two symbols (e.g., symbols #0 and #1) and both symbols may be mapped with multiple CRSs 1308. If the first PDCCH is a 2-symbol CORESET that occupies the second symbol and the third symbol (e.g., symbols #1 and #2), the first base station 1302 may map one or more DMRSs 1306 using a DMRS pattern (hereafter "new DMRS pattern") that maps DMRS REs in equal-distance in the frequency-domain (e.g., every six REs) on the second symbol and/or the third symbol. The first base station 1302 may configure the new DMRS pattern to one or more UEs via RRC signaling, such as via an RRC parameter for the CORESET configuration. In one example, as shown at 1314, the first base station 1302 and/or a UE served by the first base station 1302 may be configured to apply the new DMRS pattern when the first PDCCH (e.g., NR PDCCH) overlaps with the second PDCCH (e.g., LTE PDCCH) and/or its corresponding PDSCH regardless of whether there are DMRS colliding with CRS.

In another example, as shown at 1316, the first base station 1302 and/or a UE served by the first base station 1302 may be configured to apply the new DMRS pattern when the first PDCCH (e.g., NR PDCCH) overlaps with the second PDCCH (e.g., LTE PDCCH) and/or its corresponding PDSCH and at least one DMRS collides with at least one CRS (e.g., as shown in FIGS. 7 to 12) of the second PDCCH and/or its corresponding PDSCH. If none of the DMRS collides with CRS, the first base station 1302 and/or the UE may not apply the new DMRS pattern (even if the new DMRS pattern is configured for the CORESET). For example, an NR UE may receive a configuration (e.g., a higher-layer configuration) from the network (e.g., from an NR base station) regarding the CORESET/PDCCH configuration. If the NR UE notices that at least one DMRS collides with a CRS, then the NR UE may determine that the new DMRS pattern is to be applied. In other words, the NR UE may monitor the DMRS based on the new DMRS pattern. On the other hand, if the NR UE does not notice that at least one DMRS collides with a CRS, then the NR UE may determine that the new DMRS pattern is not to be applied. In other words, the NR UE may monitor the DMRS based on an original/unmodified/default DMRS pattern. While the example in FIG. 13 shows an NR PDCCH/CORESET overlapping with an LTE PDCCH, the NR PDCCH may also not overlap with an LTE PDCCH. For example, the NR PDCCH/CORESET may overlap with CRS mapped on LTE PDSCH, and the first base station 1302 may apply/follow the same mapping rule.

Figure 14:
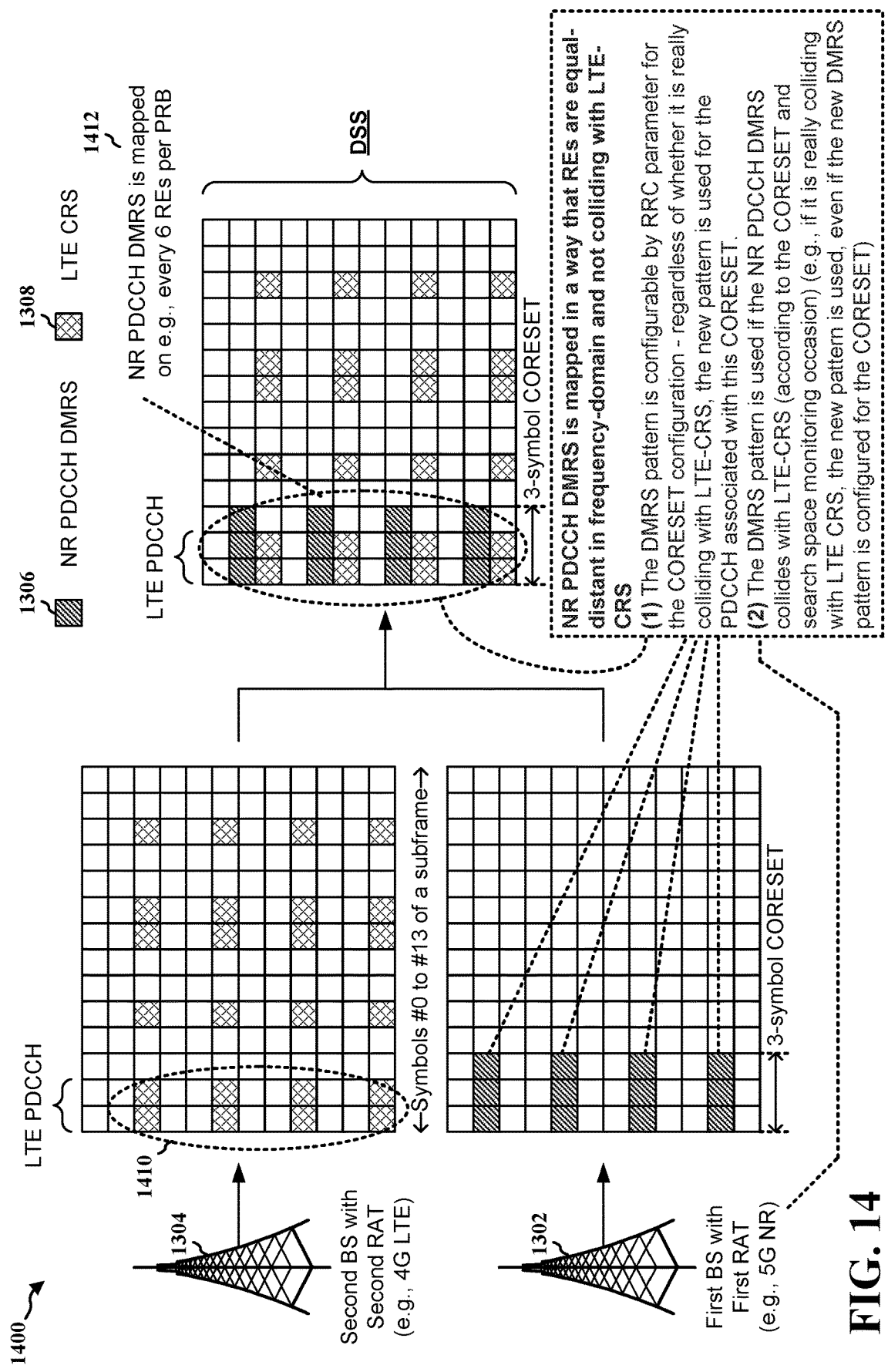
FIG. 14 is a diagram illustrating another example of a base station mapping DMRS on REs that are equal-distant in frequency-domain and not colliding with CRS during a DSS operation in accordance with various aspects of the present disclosure.

FIG. 14 is a diagram 1400 illustrating another example of a base station mapping DMRS on REs that are equal-distant in frequency-domain and not colliding with CRS during a DSS operation in accordance with various aspects of the present disclosure. In this example, as shown at 1410 and 1412, the second PDCCH may occupy the first two symbols (e.g., symbols #0 and #1) and both symbols may be mapped with multiple CRSs 1308. If the first PDCCH is a 3-symbol CORESET that occupies first three symbols (e.g., symbols #0 to #2), the first base station 1302 may map one or more DMRSs 1306 using a DMRS pattern that maps DMRS REs in equal-distance as CRS REs in the frequency-domain (e.g., with an offset) on the first symbol, the second symbol and/or the third symbol. For example, if the CRS is mapped at every three REs per physical resource block (PRB), the base station 1302 may use a DMRS pattern that maps DMRS at every three REs per PRB and does not overlap with the CRS REs. Similarly, the first base station 1302 may configure the new DMRS pattern to one or more UEs via RRC signaling, such as based on an RRC parameter for the CORESET configuration.

Similarly, in one example, the first base station 1302 and/or a UE served by the first base station 1302 may be configured to apply the new DMRS pattern when the first PDCCH (e.g., NR PDCCH) overlaps with the second PDCCH (e.g., LTE PDCCH) regardless of whether there are DMRS colliding with CRS. In another example, the first base station 1302 and/or a UE served by the first base station 1302 may be configured to apply the new DMRS pattern when the first PDCCH (e.g., NR PDCCH) overlaps with the second PDCCH (e.g., LTE PDCCH) and/or its corresponding PDSCH and at least one DMRS collides with at least one CRS (e.g., as shown in FIGS. 7 to 12) of the second PDCCH and/or its corresponding PDSCH. If none of the DMRS collides with CRS, the first base station 1302 and/or the UE may not apply the new DMRS pattern (even if the new DMRS pattern is configured for the CORESET).

Figure 15:
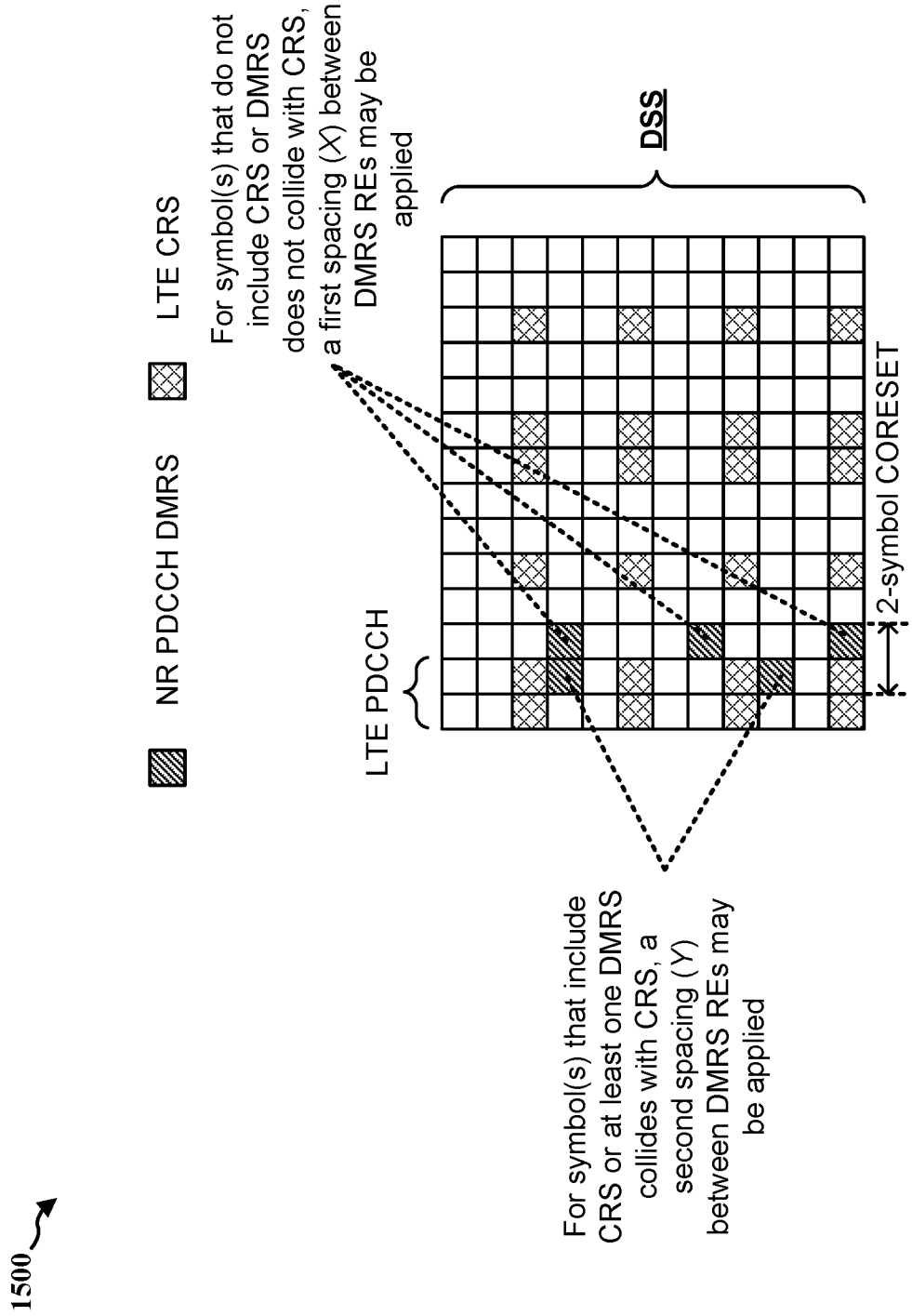
FIG. 15 is a diagram illustrating an example of mapping DMRS with different spacings in accordance with various aspect of the present disclosure.

In another example, the first base station 1302 may be configured to map DMRS on symbol(s) where CRS is not present based on a first DMRS spacing, and map DMRS on symbol(s) where CRS is present based on a second DMRS spacing. FIG. 15 is a diagram 1500 illustrating an example of mapping DMRS with different spacings in accordance with various aspect of the present disclosure. As shown at 1502, for symbol(s) that do not include CRS or DMRS does not collide with CRS in that symbol, a first spacing (X) between DMRS REs may be applied (e.g., a spacing of three REs (SCs)). As shown at 1504, for symbol(s) that include CRS or at least one DMRS collides with a CRS in that symbol, a second spacing (Y) between DMRS REs may be applied (e.g., a spacing of five REs (SCs)). As reducing a number of DMRS may affect a UE's channel estimation/decoding performance, by enabling a base station to map DMRS with different spacings, additional DMRS may be configured for the new DMRS pattern.

In another aspect of the present disclosure, the DMRS mapping/pattern described in connection with FIGS. 7 to 14 (e.g., the CORESET having new DMRS mapping/pattern (and PDCCH rate-matching around CRS)) may be used for delivering PDCCH to UEs with capabilities to support this feature (e.g., the UEs are able to monitor and decode for DMRS mapped based on rules described in connection with FIGS. 7 to 14. However, UEs that do not support such feature (e.g., LTE UEs) may not be able to decode/receive such DMRS mapping/pattern. In one example, to provide a better backward compatibility, a base station may be configured not to deliver broadcast PDCCH (e.g., DCI format 1_0 with SI-RNTI, P-RNTI, RA-RNTI, etc.) using the CORESET having the new DMRS mapping/pattern. In other examples, the base station may be configured not to apply the new DMRS mapping/pattern for PDCCHs in common search space sets. As such, in some examples, the CORESET having the new DMRS pattern may not be CORESET #0, because CORESET #0 may be configured to be a CORESET used for initial-access (e.g., by the UEs). Thus, a UE monitoring PDCCH on the CORESET having the new DMRS pattern may be configured with at least one another CORESET (e.g., CORESET #0) to receive broadcast PDCCH.

Figure 16:
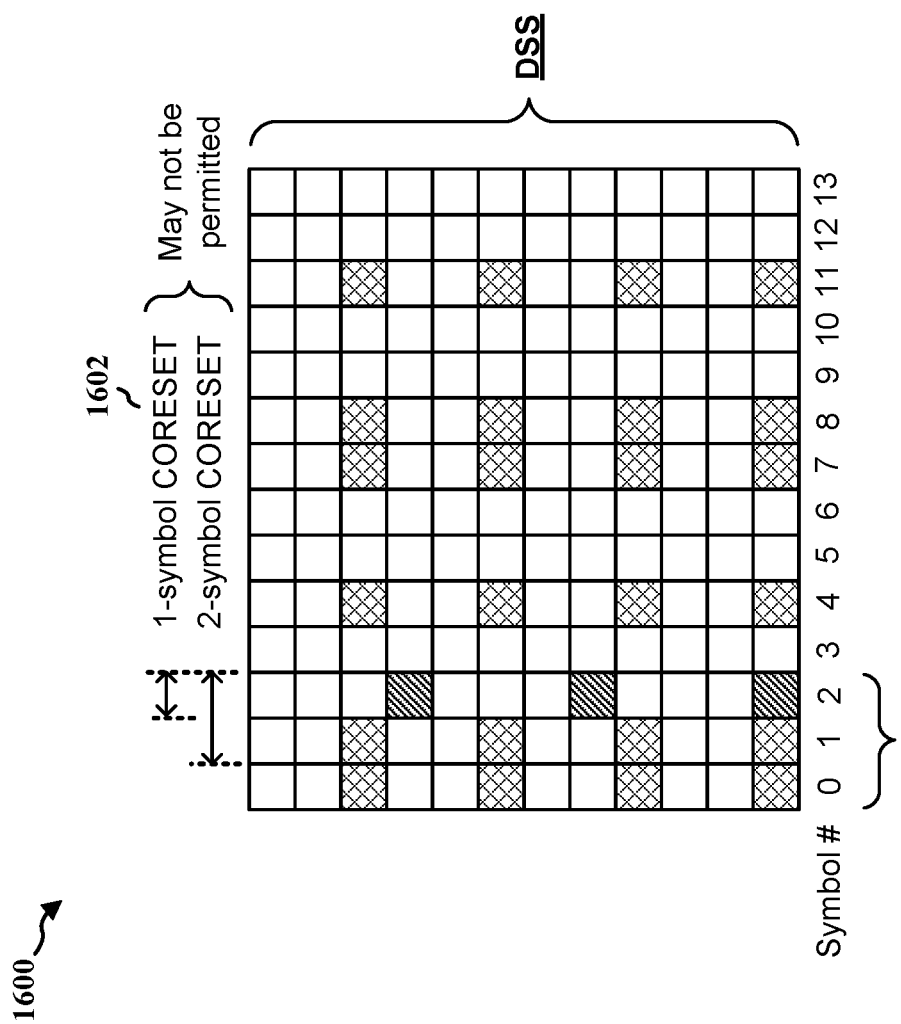
FIG. 16 is a diagram illustrating an example of two control resource sets (CORESETS) that are partially overlapped in time.

However, in some examples, if a UE is to be configured with another CORESET for broadcast PDCCH and/or for common search space sets, a base station may not be able to configure two CORESETs that may result in two or more PDCCH monitoring occasions that are at least partially overlapped in time. FIG. 16 is a diagram 1600 illustrating an example of two CORESETS that are partially overlapped in time. As shown at 1602, a base station may not (e.g., may be refrained from) configuring a 1-symbol CORESET that overlaps with a 2-symbol CORESET at least partially in time.

As such, in another aspect of the present disclosure, a base station may be configured to map PDCCH (e.g., the NR PDCCH) for the proposed CORESET (e.g., the CORESET with DMRS patterns described in connection with FIGS. 7 to 15) in a way that one or more PDCCH candidates on the symbol where CRS is not present are mapped as if it is associated with a 1-symbol CORESET. For example, referring back to FIG. 16, the base station may be configured to enable PDCCH mapping for the proposed CORESET such that the PDCCH candidates on the symbol #2 (where no LTE-CRS is present) may be mapped as if it is associated with 1-symbol CORESET on symbol #2.

Figures 17A, 17B:
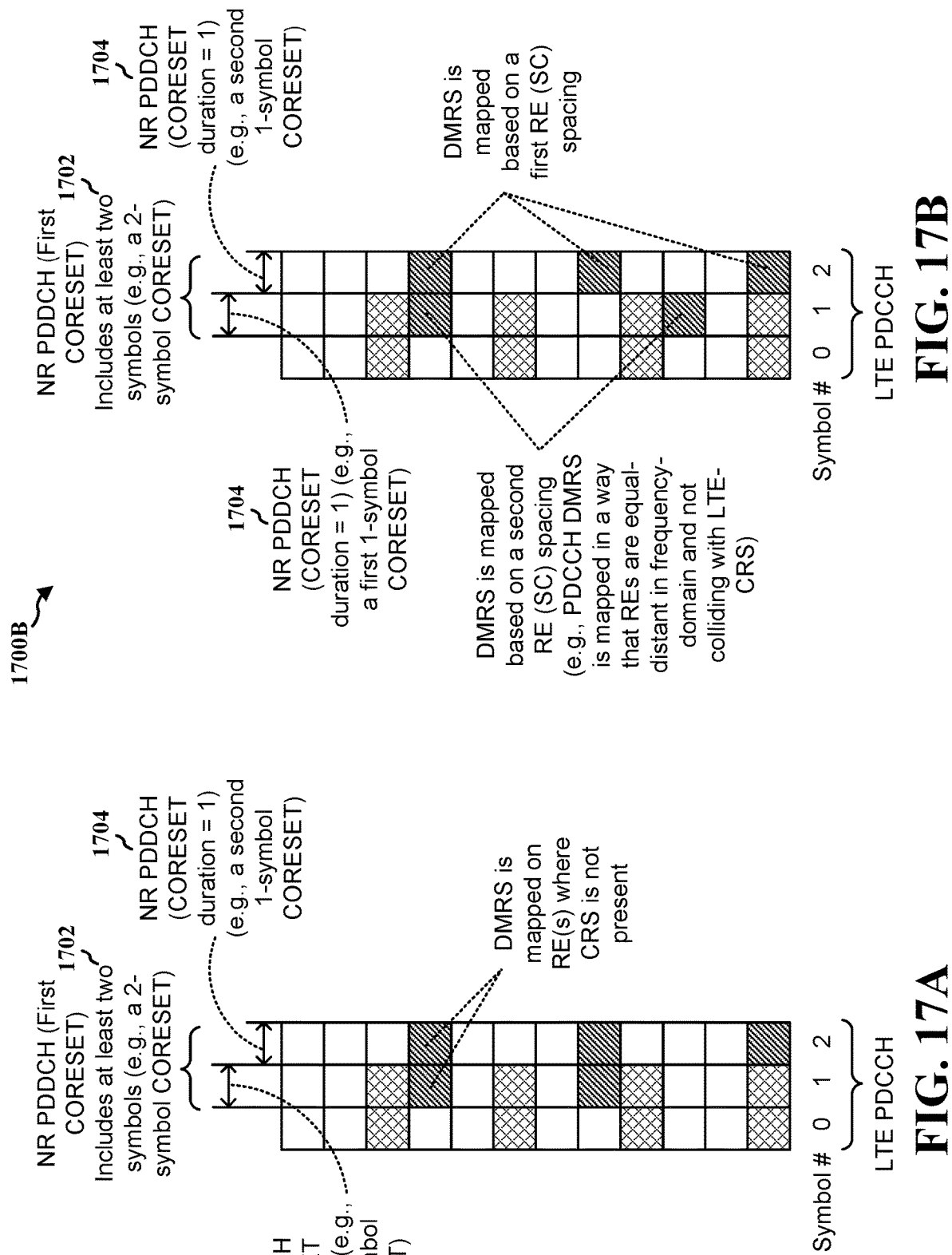
FIGS. 17A and 17B are diagrams illustrating examples of a base station mapping one or more PDCCH candidates on the symbol where CRS is not present as if it is associated with a 1-symbol CORESET in accordance with various aspects of the present disclosure.

FIGS. 17A and 17B are diagrams 1700A and 1700B illustrating examples of a base station mapping one or more PDCCH candidates on the symbol where CRS is not present as if it is associated with a 1-symbol CORESET in accordance with various aspects of the present disclosure.

In one example, as shown at 1702 of the diagram 1700A, if a 2-symbol CORESET is configured to be monitored on symbols #1 and #2, the base station may map one or more PDCCH candidates on each symbol as if 1-symbol CORESET(s) is/are configured to be monitored on the two symbols, respectively, such as shown at 1704. In such an example, the DMRS pattern may be based on the rules discussed in connection with FIGS. 7 to 15. For example, the diagram 1700A shows a mapping that is based on mapping NR PDCCH DMRS on RE(s) where CRS is not present, such as described in connection with FIGS. 10 to 12, and the diagram 1700B shows a mapping where of NR PDCCH DMRS on REs that are equal-distant in frequency-domain and not colliding with CRS (for the symbol that includes CRS), such as described in connection with FIGS. 13 and 14.

In another example, the 1-symbol CORESET(s) may be configured to be monitored on symbols #1 and #2 respectively, where the two symbols may be configured to be bundled. For example, the PDCCH and DMRS on symbols #1 and #2 may be (or assumed to be) quasi-co-located (QCLed) and/or precoded in a same way. In such an example, a base station may map PDCCH candidates on each symbol, but one PDCCH candidate may not span two symbols. In such an example, DMRS pattern over the two symbols may applied the rules described in connection with FIGS. 7 to 15. In other words, if a CORESET includes a first CORESET that is 1-symbol long and a second CORESET that is also 1-symbol long, the base station may transmit PDCCH DMRS on the first CORESET that is quasi-co-located with the PDCCH DMRS that is to be transmitted by the base station on the second CORESET. As such, the base station may apply a first DMRS mapping on symbol(s) of the first CORESET and apply a second DMRS mapping on symbol(s) of the second CORESET, where the first mapping and the second mapping may be different.

Figure 18:
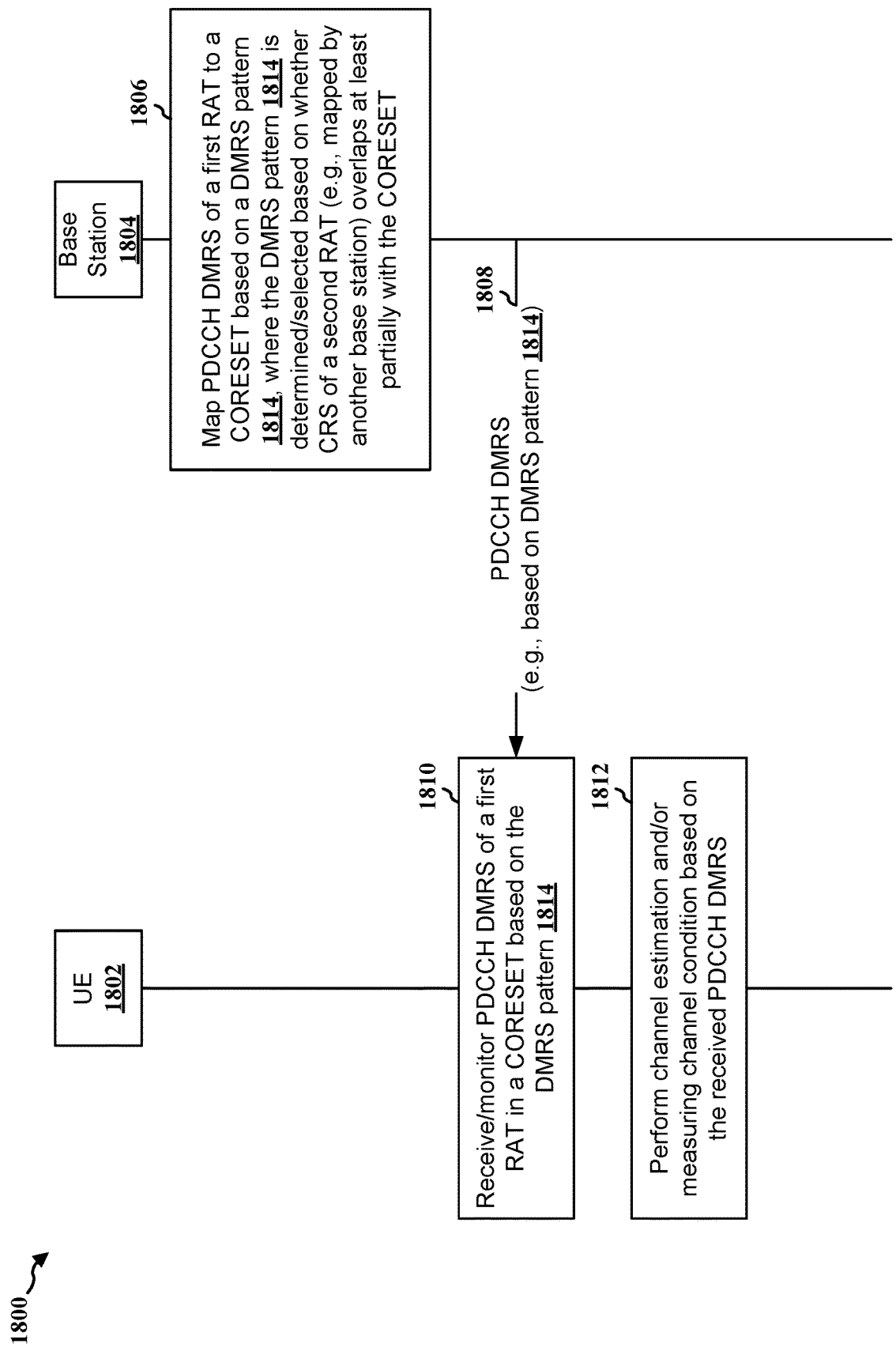
FIG. 18 is a communication flow between a UE and a base station illustrating an example of DMRS mapping during DSS operations according to various aspects of the present disclosure.

FIG. 18 is a communication flow 1800 between a UE and a base station illustrating an example of DMRS mapping during DSS operations according to various aspects of the present disclosure.

At 1806, a base station 1804 may map PDCCH DMRS of a first RAT (e.g., a network based on 5G NR standards) to a CORESET based on a DMRS pattern 1814, where the DMRS pattern 1814 may be determined/selected based on whether CRS of a second RAT is mapped to a PDCCH and/or a PDSCH of the second RAT (e.g., a network based on 4G LTE standards) overlaps at least partially with the CORESET, such as described in connection with FIGS. 7 to 17A/17B.

At 1808, the base station 1804 may transmit the PDCCH DMRS mapped to the CORESET to a UE 1802 (e.g., an NR UE).

At 1810, the UE 1802 may receive/monitor the PDCCH DMRS of the first RAT in the CORESET based on the DMRS pattern 1814. In one example, the base station 1804 may transmit the DMRS pattern 1814 (e.g., information indicating the PDCCH DMRS mapping) to the UE 1802, or the DMRS pattern 1814 (or rules regarding how DMRS pattern 1814 is selected) may be preconfigured at the UE 1802. Thus, based at least in part on the DMRS pattern 1814, the UE 1802 may determine where to monitor for the PDCCH DMRS.

At 1812, the UE 1802 may perform channel estimation and/or measuring channel condition based on the received PDCCH DMRS.

In other words, when the base station 1804 is transmitting data based on DSS and at least one of the PDCCH DMRS from the base station 1804 may collide with at least one CRS transmitted from another base station (e.g., an LTE base station), the base station 1804 may apply the DMRS pattern 1814 (e.g., selected based on one or more DMRS mapping rules), such as described in connection with FIGS. 7 to 17A/17B.

In one example, the DMRS pattern 1814 may be selected/determined based on PDCCH DMRS being mapped to symbol(s) where LTE-CRS is not present, such as described in connection with FIGS. 7 and 8. In such an example, on the REs where CRS is present, NR PDCCH may not be mapped (e.g., NR PDCCH may be rate-matched around the LTE-CRS REs), such as described in connection with FIG. 9. On the REs where the PDCCH DMRS is punctured but CRS is not present, in one example, the NR PDCCH may be mapped to these REs, such that the NR PDCCH may not be rate-matched around the punctured PDCCH DMRS REs. In another example, the NR PDCCH may not be mapped to these REs, such that the NR PDCCH may be rate-matched around the punctured NR PDCCH DMRS REs.

In another example, the DMRS pattern 1814 may be selected/determined based on PDCCH DMRS being mapped to RE(s) where LTE-CRS is not present, such as described in connection with FIGS. 10 and 12.

In another example, the DMRS pattern 1814 may be selected/determined based on PDCCH DMRS being mapped to in a way that DMRS REs are equal-distant in frequency-domain and not colliding with CRS REs, such as described in connection with FIGS. 13 and 14.

In one example, the DMRS pattern 1814 may be configurable by an RRC parameter for the CORESET configuration. The base station 1804 and/or the UE 1802 may be configured to apply the DMRS pattern 1814 regardless whether at least one DMRS is really colliding with at least one CRS, the DMRS pattern 1814 is used for the PDCCH associated with this CORESET. In another example, the base station 1804 and/or the UE 1802 may be configured to apply the DMRS pattern 1814 if the DMRS is really colliding with the CRS (according to the CORESET and search space monitoring occasion). In other words, if at least one DMRS overlaps with the CRS, the DMRS pattern 1814 may be used the base station 1804 and/or the UE 1802. Otherwise, the DMRS pattern 1814 may not be used the base station 1804 and/or the UE 1802 even if the DMRS pattern 1814 is configured for the CORESET.

In some examples, the CORESET having the DMRS pattern 1814 (and PDCCH rate-matching around CRS) may be used to deliver PDCCH for the UEs supporting this feature (e.g., the UE 1802) but not for the UEs not supporting this feature. Therefore, the CORESET having the DMRS pattern 1814 may not be able to be used by the base station 1804 to deliver broadcast PDCCH (e.g., DCI format 1_0 with SI-RNTI, P-RNTI, RA-RNTI) and/or PDCCHs in common search space sets. Thus, the CORESET having new DMRS pattern may not be CORESET #0 (e.g., CORESET #0 may be a special CORESET used/configured for initial-access). In such examples, a UE (e.g., the UE 1802) monitoring PDCCH on the CORESET having new DMRS pattern may be configured with at least one another CORESET (e.g., CORESET #0), to receive broadcast PDCCH.

In one example, as described in connection with FIGS. 17A and 17B, the base station 1804 may map PDCCH for the CORESET with the DMRS pattern 1814 as if the CORESET is associated with a 1-symbol CORESET. For example, if a 2-symbol CORESET is configured to be monitored on symbols #1 and #2, one or more PDCCH candidates may be mapped on each symbol, as if 1-symbol CORESET(s) is/are configured to be monitored on the two symbols, respectively. The DMRS pattern 1814 may then be applied to the two symbols.

In another example, 1-symbol CORESET(s) may be configured to be monitored on symbols #1 and #2 respectively, where two symbols may be bundled (e.g., PDCCH and DMRS on symbols #1 and #2 may be assumed to be QCLed and may be precoded in the same way). As such, PDCCH candidates may be mapped on each symbol where one candidate does not span two symbols, and the DMRS pattern 1814 may be applied to the two symbols.

Figure 19:
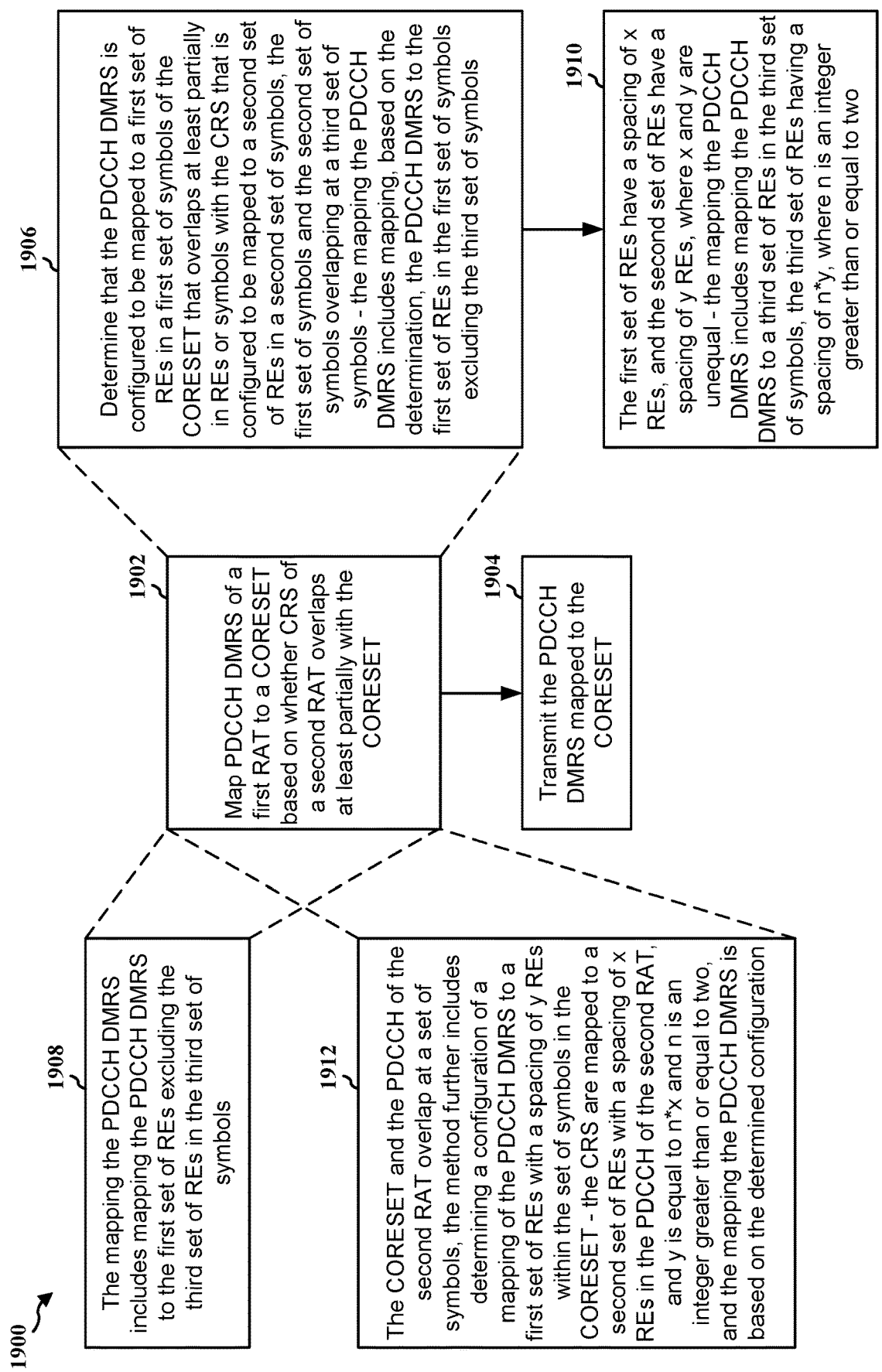
FIG. 19 is a flowchart of a method of wireless communication in accordance with aspects presented herein.

FIG. 19 is a flowchart 1900 of a method of wireless communication. The method may be performed by a base station or a component of a base station (e.g., the base station 102, 180, 310, 406, 702, 1002, 1302; the apparatus 2102; a processing system, which may include the memory 376 and which may be the entire base station 310 or a component of the base station 310, such as the TX processor 316 the RX processor 370, and/or the controller/processor 375). The method may enable the base station to map one or more NR DMRSs to one or more REs of a slot (e.g., a slot associated with DSS) based on the locations of one or more LTE CRSs in the slot.

At 1902, the base station may map PDCCH DMRS of a first RAT to a CORESET based on whether CRS of a second RAT overlaps at least partially with the CORESET, such as described in connection with FIGS. 7 to 15, 17A, 17B, and 18. For example, at 1806, the base station 1804 may map PDCCH DMRS of a first RAT to a CORESET based on a DMRS pattern 1814, where the DMRS pattern 1814 is determined/selected based on whether CRS of a second RAT overlaps at least partially with the CORESET. The mapping of the PDCCH DMRS may be performed by, e.g., the DMRS pattern determination component 2140 of the apparatus 2102 in FIG. 21. In one example, the CORESET may be a CORESET #n, where n is greater than or equal to one. In another example, the first RAT may be NR 5G and the second RAT may be LTE 4G.

In one example, as shown at 1906, the base station may determine that the PDCCH DMRS is configured to be mapped to a first set of REs in a first set of symbols of the CORESET that overlaps at least partially in REs or symbols with the CRS that is configured to be mapped to a second set of REs in a second set of symbols, the first set of symbols and the second set of symbols may overlap at a third set of symbols, where the mapping the PDCCH DMRS may include mapping, based on the determination, the PDCCH DMRS to the first set of REs in the first set of symbols excluding the third set of symbols, such as described in connection with FIGS. 7 and 8. In such an example, the base station may map PDCCH of the first RAT to at least one RE in at least one symbol of the first set of symbols, the at least one RE in the at least one symbol excluding the first set of REs in the third set of symbols, such as described in connection with 904 of FIG. 9.

In another example, the first set of REs and the second set of REs may overlap at a third set of REs. In such an example, the base station may map PDCCH of the first RAT to at least one RE in at least one symbol of the first set of symbols, where the mapping the PDCCH of the first RAT may include mapping the PDCCH of the first RAT to the first set of REs excluding the third set of REs in the third set of symbols, such as described in connection with 904 of FIG. 9.

In another example, the first set of REs and the second set of REs may overlap at a third set of REs, and as shown at 1908, the mapping the PDCCH DMRS may include mapping the PDCCH DMRS to the first set of REs excluding the third set of REs in the third set of symbols, such as described in connection with FIGS. 10 to 12.

In another example, as shown at 1910, the first set of REs may have a spacing of x REs, and the second set of REs may have a spacing of y REs, where x and y may be unequal, and the mapping the PDCCH DMRS may include mapping the PDCCH DMRS to a third set of REs in the third set of symbols, the third set of REs having a spacing of n*y, where n is an integer greater than or equal to two, such as described in connection with FIGS. 13 and 14. In such an example, the mapping the PDCCH DMRS may include mapping the PDCCH DMRS to a fourth set of REs in the first set of symbols excluding the third set of symbols, the fourth set of REs having a spacing of n*y, where n is an integer greater than or equal to two. In such an example, the mapping the PDCCH DMRS may include mapping the PDCCH DMRS to a fourth set of REs in the first set of symbols excluding the third set of symbols, the fourth set of REs having a spacing of x. In such an example, the mapping the PDCCH DMRS may include mapping the PDCCH DMRS to a fourth set of REs in the first set of symbols excluding the third set of symbols, the fourth set of REs having a spacing of y.

In another example, as shown at 1912, the CORESET and the PDCCH of the second RAT may overlap at a set of symbols, the base station may further determine a configuration of a mapping of the PDCCH DMRS to a first set of REs with a spacing of y REs within the set of symbols in the CORESET, where the CRS may be mapped to a second set of REs with a spacing of x REs in the PDCCH of the second RAT, where y is equal to n*x and n is an integer greater than or equal to two, and where the mapping the PDCCH DMRS may be based on the determined configuration, such as described in connection with FIGS. 13 and 14. In such an example, the determined configuration may include a mapping of the PDCCH DMRS to a third set of REs with a spacing of n*x REs within the CORESET excluding the set of symbols. In such an example, the determined configuration may include a mapping of the PDCCH DMRS to a third set of REs with a spacing of x REs within the CORESET excluding the set of symbols. In such an example, the determined configuration may include a mapping of the PDCCH DMRS to a third set of REs with a spacing of z REs within the CORESET excluding the set of symbols, where z is unequal to n*x for n integer greater than or equal to one.

In another example, the CORESET may include at least two symbols, and the mapping of the PDCCH DMRS may include a first mapping on a first set of symbols of the at least two symbols and a second mapping on a second set of symbols of the at least two symbols, where the first mapping and the second mapping are different, such as described in connection with FIGS. 17A and 17B.

In another example, the CORESET may include a first CORESET including one symbol and a second CORESET including one symbol, where the transmitted PDCCH DMRS on the one symbol of the first CORESET may be quasi-co-located with the transmitted PDCCH DMRS on the one symbol of the second CORESET, and the mapping of the PDCCH DMRS may include a first mapping on a set of symbols of the first CORESET and a second mapping on a set of symbols of the second CORESET, where the first mapping and the second mapping are different, such as described in connection with FIGS. 17A and 17B.

At 1904, the base station may transmit the PDCCH DMRS mapped to the CORESET, such as described in connection with FIGS. 7 to 15, 17A, 17B, and 18. For example, at 1808, the base station 1804 may transmit PDCCH DMRS that is based on the DMRS pattern 1814. The transmission of the PDCCH DMRS may be performed by, e.g., the DMRS configuration component 2142 and/or the transmission component 2134 of the apparatus 2102 in FIG. 21.

Figure 20:
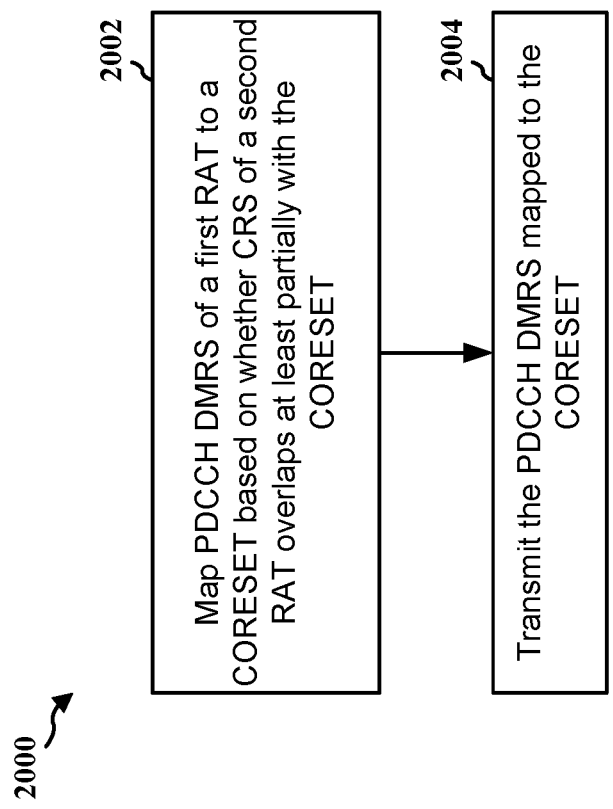
FIG. 20 is a flowchart of a method of wireless communication in accordance with aspects presented herein.

FIG. 20 is a flowchart 2000 of a method of wireless communication. The method may be performed by a base station or a component of a base station (e.g., the base station 102, 180, 310, 406, 702, 1002, 1302; the apparatus 2102; a processing system, which may include the memory 376 and which may be the entire base station 310 or a component of the base station 310, such as the TX processor 316 the RX processor 370, and/or the controller/processor 375). The method may enable the base station to map one or more NR DMRSs to one or more REs of a slot based on the locations of one or more LTE CRSs in the slot.

At 2002, the base station may map PDCCH DMRS of a first RAT to a CORESET based on whether CRS of a second RAT overlaps at least partially with the CORESET, such as described in connection with FIGS. 7 to 15, 17A, 17B, and 18. For example, at 1806, the base station 1804 may map PDCCH DMRS of a first RAT to a CORESET based on a DMRS pattern 1814, where the DMRS pattern 1814 is determined/selected based on whether CRS of a second RAT overlaps at least partially with the CORESET. The mapping of the PDCCH DMRS may be performed by, e.g., the DMRS pattern determination component 2140 of the apparatus 2102 in FIG. 21. In one example, the CORESET may be a CORESET #n, where n is greater than or equal to one. In another example, the first RAT may be NR 5G and the second RAT may be LTE 4G.

In one example, the base station may determine that the PDCCH DMRS is configured to be mapped to a first set of REs in a first set of symbols of the CORESET that overlaps at least partially in REs or symbols with the CRS that is configured to be mapped to a second set of REs in a second set of symbols, the first set of symbols and the second set of symbols may overlap at a third set of symbols, where the mapping the PDCCH DMRS may include mapping, based on the determination, the PDCCH DMRS to the first set of REs in the first set of symbols excluding the third set of symbols, such as described in connection with FIGS. 7 and 8. In such an example, the base station may map PDCCH of the first RAT to at least one RE in at least one symbol of the first set of symbols, the at least one RE in the at least one symbol excluding the first set of REs in the third set of symbols, such as described in connection with 904 of FIG. 9.

In another example, the first set of REs and the second set of REs may overlap at a third set of REs. In such an example, the base station may map PDCCH of the first RAT to at least one RE in at least one symbol of the first set of symbols, where the mapping the PDCCH of the first RAT may include mapping the PDCCH of the first RAT to the first set of REs excluding the third set of REs in the third set of symbols, such as described in connection with 904 of FIG. 9.

In another example, the first set of REs and the second set of REs may overlap at a third set of REs, and the mapping the PDCCH DMRS may include mapping the PDCCH DMRS to the first set of REs excluding the third set of REs in the third set of symbols, such as described in connection with FIGS. 10 to 12.

In another example, the first set of REs may have a spacing of x REs, and the second set of REs may have a spacing of y REs, where x and y may be unequal, and the mapping the PDCCH DMRS may include mapping the PDCCH DMRS to a third set of REs in the third set of symbols, the third set of REs having a spacing of n*y, where n is an integer greater than or equal to two, such as described in connection with FIGS. 13 and 14. In such an example, the mapping the PDCCH DMRS may include mapping the PDCCH DMRS to a fourth set of REs in the first set of symbols excluding the third set of symbols, the fourth set of REs having a spacing of n*y, where n is an integer greater than or equal to two. In such an example, the mapping the PDCCH DMRS may include mapping the PDCCH DMRS to a fourth set of REs in the first set of symbols excluding the third set of symbols, the fourth set of REs having a spacing of x. In such an example, the mapping the PDCCH DMRS may include mapping the PDCCH DMRS to a fourth set of REs in the first set of symbols excluding the third set of symbols, the fourth set of REs having a spacing of y.

In another example, the CORESET and the PDCCH of the second RAT may overlap at a set of symbols, the base station may further determine a configuration of a mapping of the PDCCH DMRS to a first set of REs with a spacing of y REs within the set of symbols in the CORESET, where the CRS may be mapped to a second set of REs with a spacing of x REs in the PDCCH of the second RAT, where y is equal to n*x and n is an integer greater than or equal to two, and where the mapping the PDCCH DMRS may be based on the determined configuration, such as described in connection with FIGS. 13 and 14. In such an example, the determined configuration may include a mapping of the PDCCH DMRS to a third set of REs with a spacing of n*x REs within the CORESET excluding the set of symbols. In such an example, the determined configuration may include a mapping of the PDCCH DMRS to a third set of REs with a spacing of x REs within the CORESET excluding the set of symbols. In such an example, the determined configuration may include a mapping of the PDCCH DMRS to a third set of REs with a spacing of z REs within the CORESET excluding the set of symbols, where z is unequal to n*x for n integer greater than or equal to one.

In another example, the CORESET may include at least two symbols, and the mapping of the PDCCH DMRS may include a first mapping on a first set of symbols of the at least two symbols and a second mapping on a second set of symbols of the at least two symbols, where the first mapping and the second mapping are different, such as described in connection with FIGS. 17A and 17B.

In another example, the CORESET may include a first CORESET including one symbol and a second CORESET including one symbol, where the transmitted PDCCH DMRS on the one symbol of the first CORESET may be quasi-co-located with the transmitted PDCCH DMRS on the one symbol of the second CORESET, and the mapping of the PDCCH DMRS may include a first mapping on a set of symbols of the first CORESET and a second mapping on a set of symbols of the second CORESET, where the first mapping and the second mapping are different, such as described in connection with FIGS. 17A and 17B.

At 2004, the base station may transmit the PDCCH DMRS mapped to the CORESET, such as described in connection with FIGS. 7 to 15, 17A, 17B, and 18. For example, at 1808, the base station 1804 may transmit PDCCH DMRS that is based on the DMRS pattern 1814. The transmission of the PDCCH DMRS may be performed by, e.g., the DMRS configuration component 2142 and/or the transmission component 2134 of the apparatus 2102 in FIG. 21.

Figure 21:
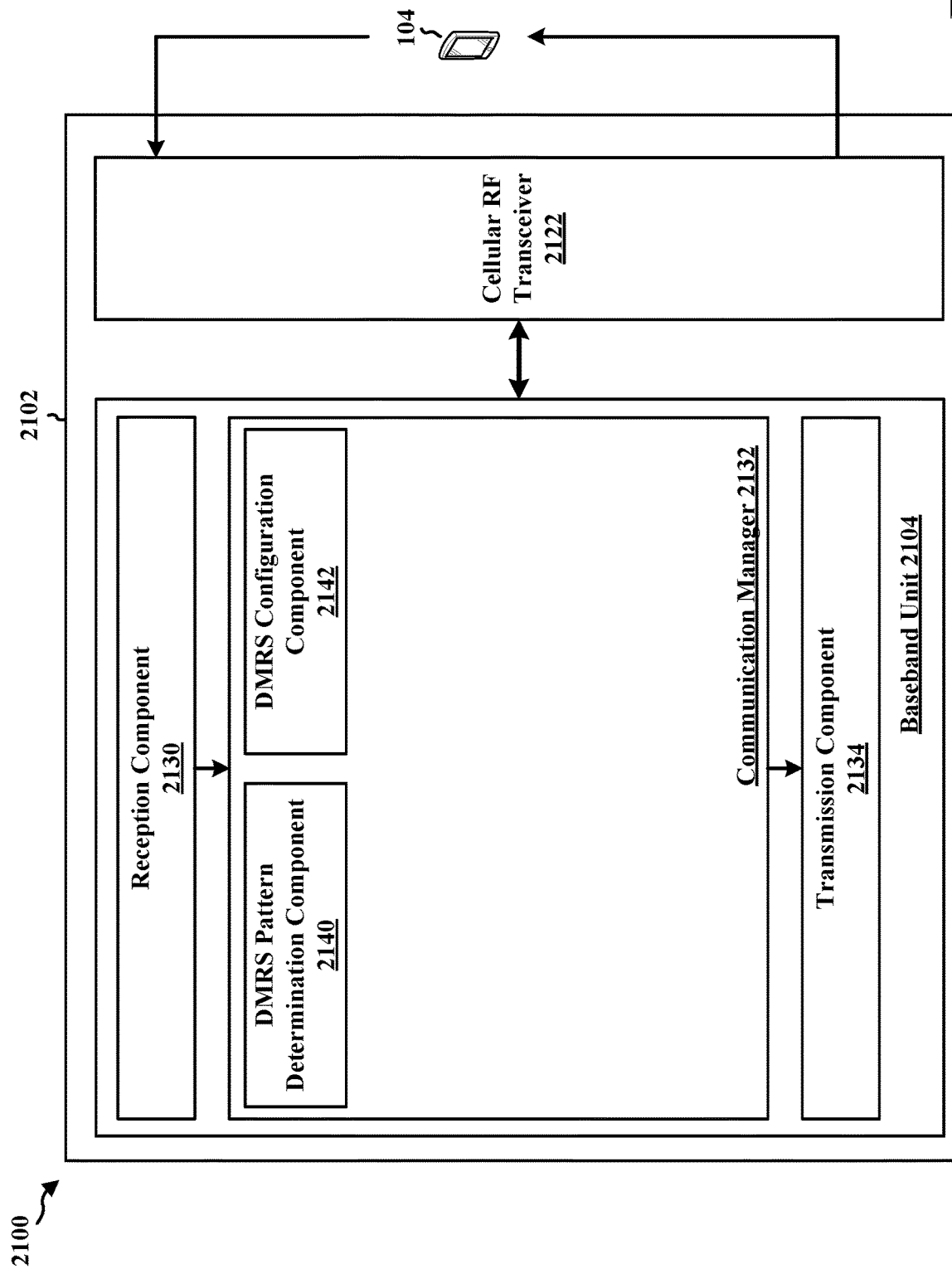
FIG. 21 is a diagram illustrating an example of a hardware implementation for an example apparatus in accordance with aspects presented herein.

FIG. 21 is a diagram 2100 illustrating an example of a hardware implementation for an apparatus 2102. The apparatus 2102 may be a base station, a component of a base station, or may implement base station functionality. In some aspects, the apparatus 2102 may include a baseband unit 2104. The baseband unit 2104 may communicate through a cellular RF transceiver 2122 with the UE 104. The baseband unit 2104 may include a computer-readable medium/memory. The baseband unit 2104 is responsible for general processing, including the execution of software stored on the computer-readable medium/memory. The software, when executed by the baseband unit 2104, causes the baseband unit 2104 to perform the various functions described supra. The computer-readable medium/memory may also be used for storing data that is manipulated by the baseband unit 2104 when executing software. The baseband unit 2104 further includes a reception component 2130, a communication manager 2132, and a transmission component 2134. The communication manager 2132 includes the one or more illustrated components. The components within the communication manager 2132 may be stored in the computer-readable medium/memory and/or configured as hardware within the baseband unit 2104. The baseband unit 2104 may be a component of the base station 310 and may include the memory 376 and/or at least one of the TX processor 316, the RX processor 370, and the controller/processor 375.

The communication manager 2132 includes a DMRS pattern determination component 2140 that map PDCCH DMRS of a first RAT to a CORESET based on whether CRS of a second RAT overlaps at least partially with the CORESET, e.g., as described in connection with 1902 of FIG. 19 and/or 2002 of FIG. 20. The communication manager 2132 further includes a DMRS configuration component 2142 that transmits the PDCCH DMRS mapped to the CORESET, e.g., as described in connection with 1904 of FIG. 19 and/or 2004 of FIG. 20.

The apparatus may include additional components that perform each of the blocks of the algorithm in the flowcharts of FIGS. 19 and 20. As such, each block in the flowcharts of FIGS. 19 and 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2102 may include a variety of components configured for various functions. In one configuration, the apparatus 2102, and in particular the baseband unit 2104, includes means for mapping PDCCH DMRS of a first RAT to a CORESET based on whether CRS of a second RAT overlaps at least partially with the CORESET (e.g., the DMRS pattern determination component 2140). The apparatus 1902 includes means for transmitting the PDCCH DMRS mapped to the CORESET (e.g., the DMRS configuration component 2142 and/or the transmission component 2134). In one configuration, the CORESET may be a CORESET #n, where n is greater than or equal to one. In another configuration, the first RAT may be NR 5G and the second RAT may be LTE 4G.

In one configuration, the apparatus 2102 may determine that the PDCCH DMRS is configured to be mapped to a first set of REs in a first set of symbols of the CORESET that overlaps at least partially in REs or symbols with the CRS that is configured to be mapped to a second set of REs in a second set of symbols, the first set of symbols and the second set of symbols may overlap at a third set of symbols, where the mapping the PDCCH DMRS may include mapping, based on the determination, the PDCCH DMRS to the first set of REs in the first set of symbols excluding the third set of symbols. In such a configuration, the apparatus 2102 may map PDCCH of the first RAT to at least one RE in at least one symbol of the first set of symbols, the at least one RE in the at least one symbol excluding the first set of REs in the third set of symbols.

In another configuration, the first set of REs and the second set of REs may overlap at a third set of REs. In such a configuration, the apparatus 2102 may map PDCCH of the first RAT to at least one RE in at least one symbol of the first set of symbols, where the mapping the PDCCH of the first RAT may include mapping the PDCCH of the first RAT to the first set of REs excluding the third set of REs in the third set of symbols.

In another configuration, the first set of REs and the second set of REs may overlap at a third set of REs, and the mapping the PDCCH DMRS may include mapping the PDCCH DMRS to the first set of REs excluding the third set of REs in the third set of symbols.

In another configuration, the first set of REs may have a spacing of x REs, and the second set of REs may have a spacing of y REs, where x and y may be unequal, and the mapping the PDCCH DMRS may include mapping the PDCCH DMRS to a third set of REs in the third set of symbols, the third set of REs having a spacing of n*y, where n is an integer greater than or equal to two, such as described in connection with FIGS. 13 and 14. In such a configuration, the mapping the PDCCH DMRS may include mapping the PDCCH DMRS to a fourth set of REs in the first set of symbols excluding the third set of symbols, the fourth set of REs having a spacing of n*y, where n is an integer greater than or equal to two. In such a configuration, the mapping the PDCCH DMRS may include mapping the PDCCH DMRS to a fourth set of REs in the first set of symbols excluding the third set of symbols, the fourth set of REs having a spacing of x. In such a configuration, the mapping the PDCCH DMRS may include mapping the PDCCH DMRS to a fourth set of REs in the first set of symbols excluding the third set of symbols, the fourth set of REs having a spacing of y.

In another configuration, the CORESET and the PDCCH of the second RAT may overlap at a set of symbols, the apparatus 2102 may further determine a configuration of a mapping of the PDCCH DMRS to a first set of REs with a spacing of y REs within the set of symbols in the CORESET, where the CRS may be mapped to a second set of REs with a spacing of x REs in the PDCCH of the second RAT, where y is equal to n*x and n is an integer greater than or equal to two, and where the mapping the PDCCH DMRS may be based on the determined configuration. In such a configuration, the determined configuration may include a mapping of the PDCCH DMRS to a third set of REs with a spacing of n*x REs within the CORESET excluding the set of symbols. In such a configuration, the determined configuration may include a mapping of the PDCCH DMRS to a third set of REs with a spacing of x REs within the CORESET excluding the set of symbols. In such a configuration, the determined configuration may include a mapping of the PDCCH DMRS to a third set of REs with a spacing of z REs within the CORESET excluding the set of symbols, where z is unequal to n*x for n integer greater than or equal to one.

In another configuration, the CORESET may include at least two symbols, and the mapping of the PDCCH DMRS may include a first mapping on a first set of symbols of the at least two symbols and a second mapping on a second set of symbols of the at least two symbols, where the first mapping and the second mapping are different.

In another configuration, the CORESET may include a first CORESET including one symbol and a second CORE-SET including one symbol, where the transmitted PDCCH DMRS on the one symbol of the first CORESET may be quasi-co-located with the transmitted PDCCH DMRS on the one symbol of the second CORESET, and the mapping of the PDCCH DMRS may include a first mapping on a set of symbols of the first CORESET and a second mapping on a set of symbols of the second CORESET, where the first mapping and the second mapping are different.

The means may be one or more of the components of the apparatus 2102 configured to perform the functions recited by the means. As described supra, the apparatus 2102 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 22:
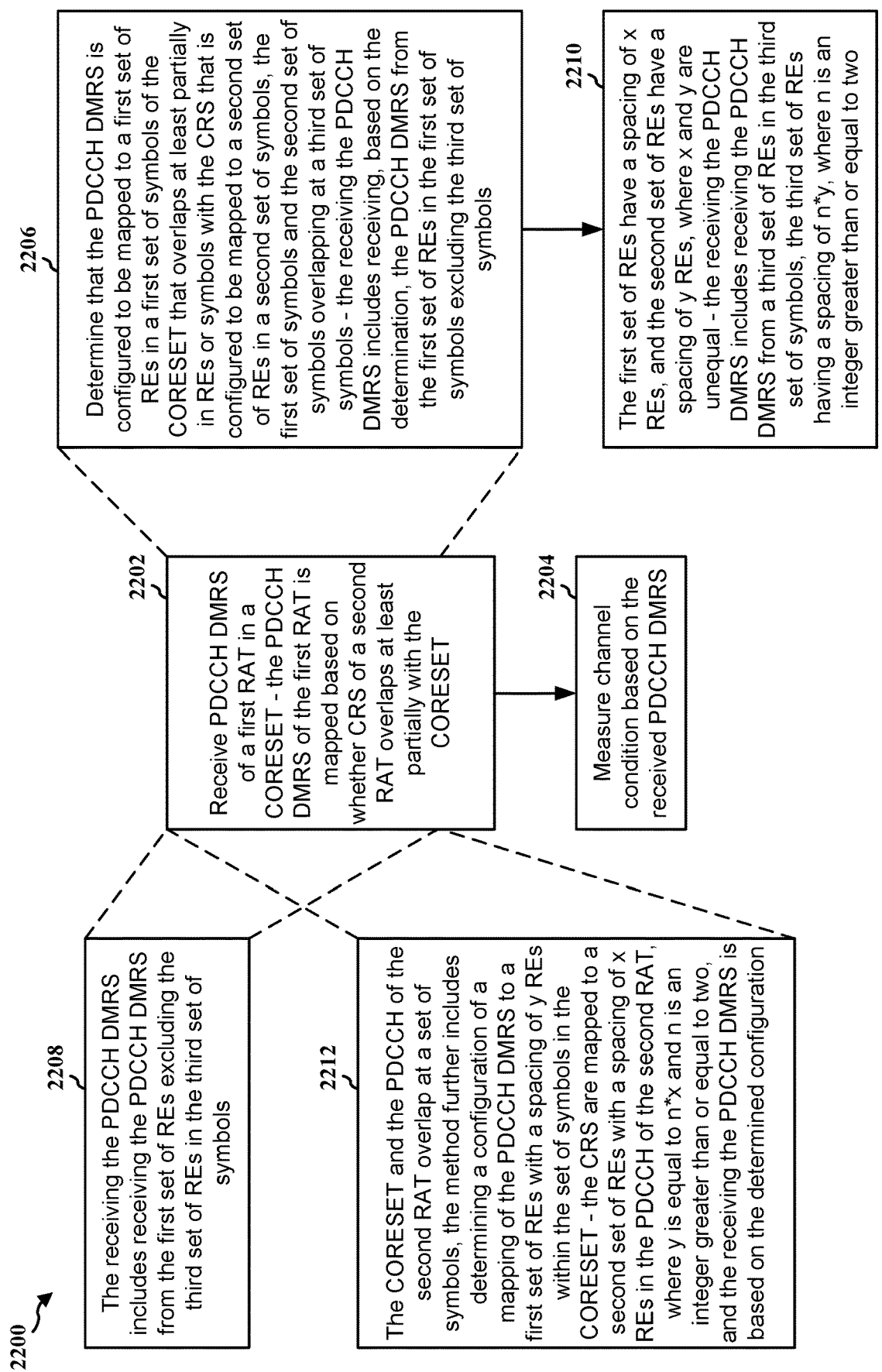
FIG. 22 is a flowchart of a method of wireless communication in accordance with aspects presented herein.

FIG. 22 is a flowchart 2200 of a method of wireless communication. The method may be performed by a UE or a component of a UE (e.g., the UE 104, 350, 430, 1802; the apparatus 2402; a processing system, which may include the memory 360 and which may be the entire UE 350 or a component of the UE 350, such as the TX processor 368, the RX processor 356, and/or the controller/processor 359). The method may enable a UE to monitor/receive one or more NR DMRSs in one or more REs of a slot (e.g., a slot associated with DSS) based on the locations of one or more LTE CRSs in the slot when NR PDCCH is at least partially overlapped with LTE PDCCH in the slot.

At 2202, the UE may receive PDCCH DMRS of a first RAT in a CORESET, where the PDCCH DMRS of the first RAT is mapped based on whether CRS of a second RAT overlaps at least partially with the CORESET, such as described in connection with FIGS. 7 to 15, 17A, 17B, and 18. For example, at 1810, the UE 1802 may receive/monitor PDCCH DMRS of a first RAT in a CORESET based on the DMRS pattern 1814, where the DMRS pattern 1814 may be determined/selected based on whether CRS of a second RAT overlaps at least partially with the CORESET. The reception of the PDCCH DMRS may be performed by, e.g., the DMRS pattern process component 2440 and/or the reception component 2430 of the apparatus 2402 in FIG. 24. In one example, the CORESET may be a CORESET #n, where n is greater than or equal to one. In another example, the first RAT may be NR 5G and the second RAT may be LTE 4G.

In one example, as shown at 2206, the UE may determine that the PDCCH DMRS is configured to be mapped to a first set of REs in a first set of symbols of the CORESET that overlaps at least partially in REs or symbols with the CRS that is configured to be mapped to a second set of REs in a second set of symbols, the first set of symbols and the second set of symbols may overlap at a third set of symbols, where the receiving the PDCCH DMRS may include receiving, based on the determination, the PDCCH DMRS from the first set of REs in the first set of symbols excluding the third set of symbols, such as described in connection with FIGS. 7 and 8. In such an example, the UE may receive PDCCH of the first RAT from at least one RE in at least one symbol of the first set of symbols, the at least one RE in the at least one symbol excluding the first set of REs in the third set of symbols, such as described in connection with 904 of FIG. 9.

In another example, the first set of REs and the second set of REs may overlap at a third set of REs. In such an example, the UE may receive PDCCH of the first RAT from at least one RE in at least one symbol of the first set of symbols, where the receiving the PDCCH of the first RAT may include receiving the PDCCH of the first RAT to the first set of REs excluding the third set of REs in the third set of symbols, such as described in connection with 904 of FIG. 9.

In another example, the first set of REs and the second set of REs may overlap at a third set of REs, and as shown at 2208, the receiving the PDCCH DMRS may include receiving the PDCCH DMRS from the first set of REs excluding the third set of REs in the third set of symbols, such as described in connection with FIGS. 10 to 12.

In another example, as shown at 2210, the first set of REs may have a spacing of x REs, and the second set of REs may have a spacing of y REs, where x and y may be unequal, and the receiving the PDCCH DMRS may include receiving the PDCCH DMRS from a third set of REs in the third set of symbols, the third set of REs having a spacing of n*y, where n is an integer greater than or equal to two, such as described in connection with FIGS. 13 and 14. In such an example, the receiving the PDCCH DMRS may include receiving the PDCCH DMRS from a fourth set of REs in the first set of symbols excluding the third set of symbols, the fourth set of REs having a spacing of n*y, where n is an integer greater than or equal to two. In such an example, the receiving the PDCCH DMRS may include receiving the PDCCH DMRS from a fourth set of REs in the first set of symbols excluding the third set of symbols, the fourth set of REs having a spacing of x. In such an example, the receiving the PDCCH DMRS may include receiving the PDCCH DMRS from a fourth set of REs in the first set of symbols excluding the third set of symbols, the fourth set of REs having a spacing of y.

In another example, as shown at 2212, the CORESET and the PDCCH of the second RAT may overlap at a set of symbols, the UE may determine a configuration of a mapping of the PDCCH DMRS to a first set of REs with a spacing of y REs within the set of symbols in the CORESET, where the CRS may be mapped to a second set of REs with a spacing of x REs in the PDCCH of the second RAT, where y is equal to n*x and n is an integer greater than or equal to two, and the receiving the PDCCH DMRS may be based on the determined configuration, such as described in connection with FIGS. 13 and 14. In such an example, the determined configuration may include a mapping of the PDCCH DMRS to a third set of REs with a spacing of n*x REs within the CORESET excluding the set of symbols. In such an example, the determined configuration may include a mapping of the PDCCH DMRS to a third set of REs with a spacing of x REs within the CORESET excluding the set of symbols. In such an example, the determined configuration may include a mapping of the PDCCH DMRS to a third set of REs with a spacing of z REs within the CORESET excluding the set of symbols, where z is unequal to n*x for n integer greater than or equal to one.

In another example, the CORESET may include at least two symbols, and the receiving of the PDCCH DMRS may include receiving a first set of DMRS on a first set of symbols of the at least two symbols and a second set of DMRS on a second set of symbols of the at least two symbols, where the first set of DMRS and the second set of DMRS may be mapped differently, such as described in connection with FIGS. 17A and 17B.

In another example, the CORESET may include a first CORESET including one symbol and a second CORESET including one symbol, where the PDCCH DMRS received on the one symbol of the first CORESET may be quasi-co-located with the PDCCH DMRS received on the one symbol of the second CORESET, and the receiving of the PDCCH DMRS may include receiving a first set of DMRS on a set of symbols of the first CORESET and a second set of DMRS on a set of symbols of the second CORESET, where the first set of DMRS and the second set of DMRS are mapped differently, such as described in connection with FIGS. 17A and 17B.

At 2204, the UE measure channel condition based on the received PDCCH DMRS, such as described in connection with FIG. 18. For example, at 1812, the UE 1802 may perform channel estimation and/or measuring channel condition based on the received PDCCH DMRS. The measuring of the channel condition may be performed by, e.g., the channel condition measurement component 2442 of the apparatus 2402 in FIG. 24.

Figure 23:
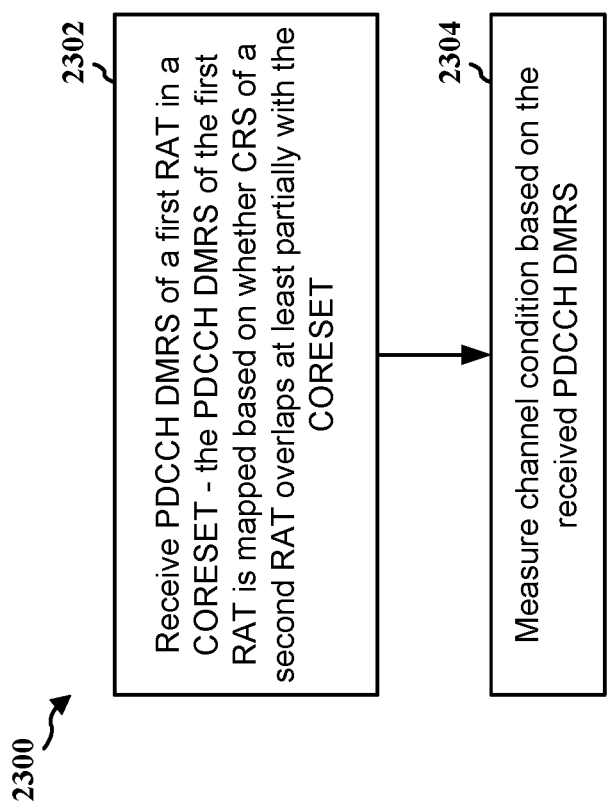
FIG. 23 is a flowchart of a method of wireless communication in accordance with aspects presented herein.

FIG. 23 is a flowchart 2300 of a method of wireless communication. The method may be performed by a UE or a component of a UE (e.g., the UE 104, 350, 430, 1802; the apparatus 2402; a processing system, which may include the memory 360 and which may be the entire UE 350 or a component of the UE 350, such as the TX processor 368, the RX processor 356, and/or the controller/processor 359). The method may enable a UE to monitor/receive one or more NR DMRSs in one or more REs of a slot based on the locations of one or more LTE CRSs in the slot when NR PDCCH is at least partially overlapped with LTE PDCCH in the slot.

At 2302, the UE may receive PDCCH DMRS of a first RAT in a CORESET, where the PDCCH DMRS of the first RAT is mapped based on whether CRS of a second RAT overlaps at least partially with the CORESET, such as described in connection with FIGS. 7 to 15, 17A, 17B, and 18. For example, at 1810, the UE 1802 may receive/monitor PDCCH DMRS of a first RAT in a CORESET based on the DMRS pattern 1814, where the DMRS pattern 1814 may be determined/selected based on whether CRS of a second RAT overlaps at least partially with the CORESET. The reception of the PDCCH DMRS may be performed by, e.g., the DMRS pattern process component 2440 and/or the reception component 2430 of the apparatus 2402 in FIG. 24. In one example, the CORESET may be a CORESET #n, where n is greater than or equal to one. In another example, the first RAT may be NR 5G and the second RAT may be LTE 4G.

In one example, the UE may determine that the PDCCH DMRS is configured to be mapped to a first set of REs in a first set of symbols of the CORESET that overlaps at least partially in REs or symbols with the CRS that is configured to be mapped to a second set of REs in a second set of symbols, the first set of symbols and the second set of symbols may overlap at a third set of symbols, where the receiving the PDCCH DMRS may include receiving, based on the determination, the PDCCH DMRS from the first set of REs in the first set of symbols excluding the third set of symbols, such as described in connection with FIGS. 7 and 8. In such an example, the UE may receive PDCCH of the first RAT from at least one RE in at least one symbol of the first set of symbols, the at least one RE in the at least one symbol excluding the first set of REs in the third set of symbols, such as described in connection with 904 of FIG. 9.

In another example, the first set of REs and the second set of REs may overlap at a third set of REs. In such an example, the UE may receive PDCCH of the first RAT from at least one RE in at least one symbol of the first set of symbols, where the receiving the PDCCH of the first RAT may include receiving the PDCCH of the first RAT to the first set of REs excluding the third set of REs in the third set of symbols, such as described in connection with 904 of FIG. 9.

In another example, the first set of REs and the second set of REs may overlap at a third set of REs, and the receiving the PDCCH DMRS may include receiving the PDCCH DMRS from the first set of REs excluding the third set of REs in the third set of symbols, such as described in connection with FIGS. 10 to 12.

In another example, the first set of REs may have a spacing of x REs, and the second set of REs may have a spacing of y REs, where x and y may be unequal, and the receiving the PDCCH DMRS may include receiving the PDCCH DMRS from a third set of REs in the third set of symbols, the third set of REs having a spacing of n*y, where n is an integer greater than or equal to two, such as described in connection with FIGS. 13 and 14. In such an example, the receiving the PDCCH DMRS may include receiving the PDCCH DMRS from a fourth set of REs in the first set of symbols excluding the third set of symbols, the fourth set of REs having a spacing of n*y, where n is an integer greater than or equal to two. In such an example, the receiving the PDCCH DMRS may include receiving the PDCCH DMRS from a fourth set of REs in the first set of symbols excluding the third set of symbols, the fourth set of REs having a spacing of x. In such an example, the receiving the PDCCH DMRS may include receiving the PDCCH DMRS from a fourth set of REs in the first set of symbols excluding the third set of symbols, the fourth set of REs having a spacing of y.

In another example, the CORESET and the PDCCH of the second RAT may overlap at a set of symbols, the UE may determine a configuration of a mapping of the PDCCH DMRS to a first set of REs with a spacing of y REs within the set of symbols in the CORESET, where the CRS may be mapped to a second set of REs with a spacing of x REs in the PDCCH of the second RAT, where y is equal to n*x and n is an integer greater than or equal to two, and the receiving the PDCCH DMRS may be based on the determined configuration, such as described in connection with FIGS. 13 and 14. In such an example, the determined configuration may include a mapping of the PDCCH DMRS to a third set of REs with a spacing of n*x REs within the CORESET excluding the set of symbols. In such an example, the determined configuration may include a mapping of the PDCCH DMRS to a third set of REs with a spacing of x REs within the CORESET excluding the set of symbols. In such an example, the determined configuration may include a mapping of the PDCCH DMRS to a third set of REs with a spacing of z REs within the CORESET excluding the set of symbols, where z is unequal to n*x for n integer greater than or equal to one.

In another example, the CORESET may include at least two symbols, and the receiving of the PDCCH DMRS may include receiving a first set of DMRS on a first set of symbols of the at least two symbols and a second set of DMRS on a second set of symbols of the at least two symbols, where the first set of DMRS and the second set of DMRS may be mapped differently, such as described in connection with FIGS. 17A and 17B.

In another example, the CORESET may include a first CORESET including one symbol and a second CORESET including one symbol, where the PDCCH DMRS received on the one symbol of the first CORESET may be quasi-co-located with the PDCCH DMRS received on the one symbol of the second CORESET, and the receiving of the PDCCH DMRS may include receiving a first set of DMRS on a set of symbols of the first CORESET and a second set of DMRS on a set of symbols of the second CORESET, where the first set of DMRS and the second set of DMRS are mapped differently, such as described in connection with FIGS. 17A and 17B.

At 2304, the UE measure channel condition based on the received PDCCH DMRS, such as described in connection with FIG. 18. For example, at 1812, the UE 1802 may perform channel estimation and/or measuring channel condition based on the received PDCCH DMRS. The measuring of the channel condition may be performed by, e.g., the channel condition measurement component 2442 of the apparatus 2402 in FIG. 24.

Figure 24:
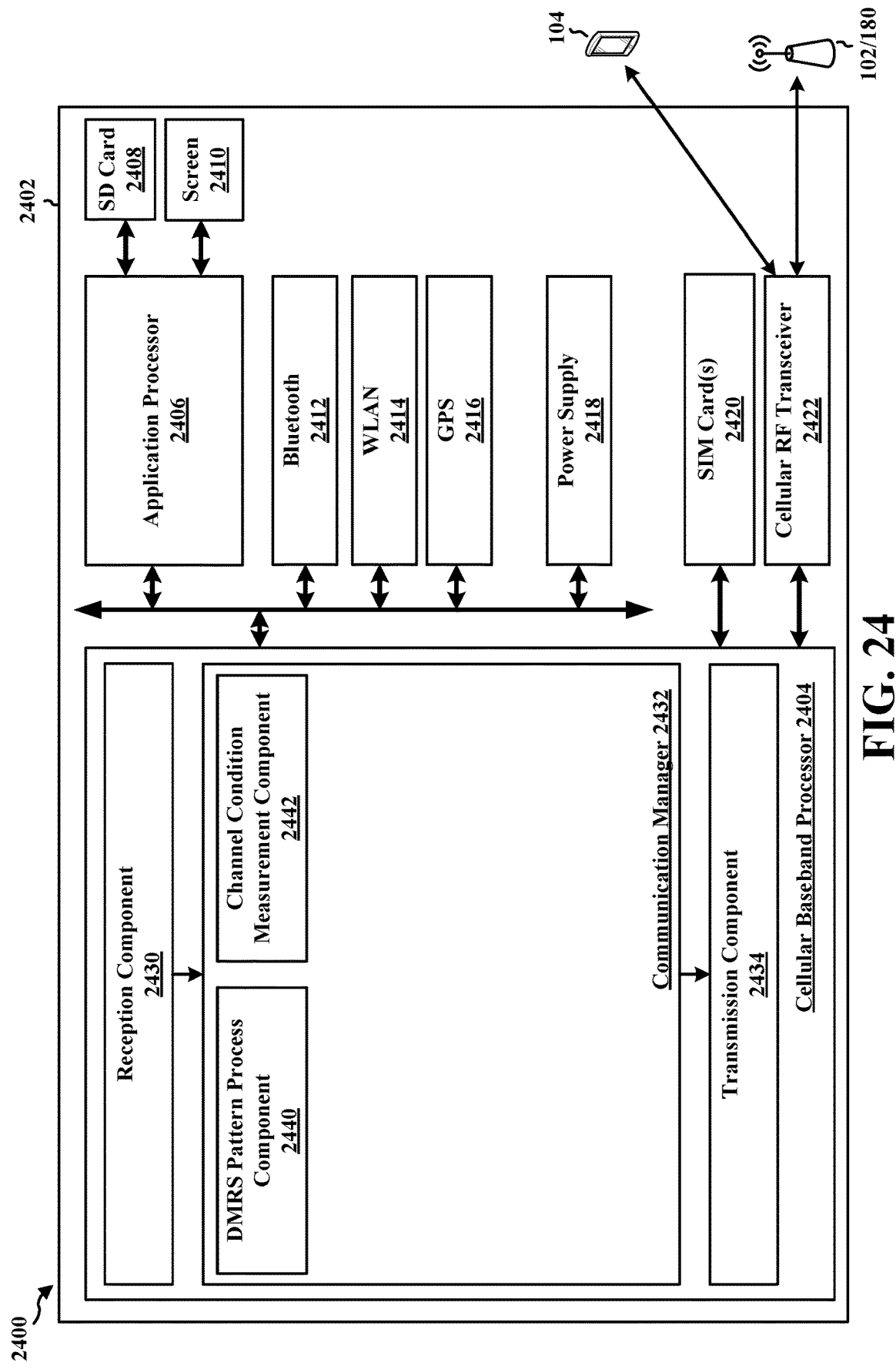
FIG. 24 is a diagram illustrating an example of a hardware implementation for an example apparatus in accordance with aspects presented herein.

FIG. 24 is a diagram 2400 illustrating an example of a hardware implementation for an apparatus 2402. The apparatus 2402 may be a UE, a component of a UE, or may implement UE functionality. In some aspects, the apparatus 2402 may include a cellular baseband processor 2404 (also referred to as a modem) coupled to a cellular RF transceiver 2422. In some aspects, the apparatus 2402 may further include one or more subscriber identity modules (SIM) cards 2420, an application processor 2406 coupled to a secure digital (SD) card 2408 and a screen 2410, a Bluetooth module 2412, a wireless local area network (WLAN) module 2414, a Global Positioning System (GPS) module 2416, or a power supply 2418. The cellular baseband processor 2404 communicates through the cellular RF transceiver 2422 with the UE 104 and/or BS 102/180. The cellular baseband processor 2404 may include a computer-readable medium/memory. The computer-readable medium/memory may be non-transitory. The cellular baseband processor 2404 is responsible for general processing, including the execution of software stored on the computer-readable medium/memory. The software, when executed by the cellular baseband processor 2404, causes the cellular baseband processor 2404 to perform the various functions described supra. The computer-readable medium/memory may also be used for storing data that is manipulated by the cellular baseband processor 2404 when executing software. The cellular baseband processor 2404 further includes a reception component 2430, a communication manager 2432, and a transmission component 2434. The communication manager 2432 includes the one or more illustrated components. The components within the communication manager 2432 may be stored in the computer-readable medium/memory and/or configured as hardware within the cellular baseband processor 2404. The cellular baseband processor 2404 may be a component of the UE 350 and may include the memory 360 and/or at least one of the TX processor 368, the RX processor 356, and the controller/processor 359. In one configuration, the apparatus 2402 may be a modem chip and include just the baseband processor 2404, and in another configuration, the apparatus 2402 may be the entire UE (e.g., see 350 of FIG. 3) and include the additional modules of the apparatus 2402.

The communication manager 2432 includes a DMRS pattern process component 2440 that is configured to receive PDCCH DMRS of a first RAT in a CORESET, where the PDCCH DMRS of the first RAT is mapped based on whether CRS of a second RAT overlaps at least partially with the CORESET, e.g., as described in connection with 2202 of FIG. 22 and/or 2302 of FIG. 23. The communication manager 2432 further includes a channel condition measurement component 2442 that is configured to measure channel condition based on the received PDCCH DMRS, e.g., as described in connection with 2204 of FIG. 22 and/or 2304 of FIG. 23.

The apparatus may include additional components that perform each of the blocks of the algorithm in the flowcharts of FIGS. 22 and 23. As such, each block in the flowcharts of FIGS. 22 and 23 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2402 may include a variety of components configured for various functions. In one configuration, the apparatus 2402, and in particular the cellular baseband processor 2404, includes means for receiving PDCCH DMRS of a first RAT in a CORESET, where the PDCCH DMRS of the first RAT is mapped based on whether CRS of a second RAT overlaps at least partially with the CORESET (e.g., the DMRS pattern process component 2440 and/or the reception component 2430). The apparatus 2402 includes means for measuring channel condition based on the received PDCCH DMRS (e.g., the channel condition measurement component 2442).

In one configuration, the CORESET may be a CORESET #n, where n is greater than or equal to one. In another configuration, the first RAT may be NR 5G and the second RAT may be LTE 4G.

In one configuration, the UE may determine that the PDCCH DMRS is configured to be mapped to a first set of REs in a first set of symbols of the CORESET that overlaps at least partially in REs or symbols with the CRS that is configured to be mapped to a second set of REs in a second set of symbols, the first set of symbols and the second set of symbols may overlap at a third set of symbols, where the receiving the PDCCH DMRS may include receiving, based on the determination, the PDCCH DMRS from the first set of REs in the first set of symbols excluding the third set of symbols. In such a configuration, the UE may receive PDCCH of the first RAT from at least one RE in at least one symbol of the first set of symbols, the at least one RE in the at least one symbol excluding the first set of REs in the third set of symbols.

In another configuration, the first set of REs and the second set of REs may overlap at a third set of REs. In such a configuration, the UE may receive PDCCH of the first RAT from at least one RE in at least one symbol of the first set of symbols, where the receiving the PDCCH of the first RAT may include receiving the PDCCH of the first RAT to the first set of REs excluding the third set of REs in the third set of symbols.

In another configuration, the first set of REs and the second set of REs may overlap at a third set of REs, the receiving the PDCCH DMRS may include receiving the PDCCH DMRS from the first set of REs excluding the third set of REs in the third set of symbols.

In another configuration, the first set of REs may have a spacing of x REs, and the second set of REs may have a spacing of y REs, where x and y may be unequal, and the receiving the PDCCH DMRS may include receiving the PDCCH DMRS from a third set of REs in the third set of symbols, the third set of REs having a spacing of n*y, where n is an integer greater than or equal to two. In such a configuration, the receiving the PDCCH DMRS may include receiving the PDCCH DMRS from a fourth set of REs in the first set of symbols excluding the third set of symbols, the fourth set of REs having a spacing of n*y, where n is an integer greater than or equal to two. In such a configuration, the receiving the PDCCH DMRS may include receiving the PDCCH DMRS from a fourth set of REs in the first set of symbols excluding the third set of symbols, the fourth set of REs having a spacing of x. In such a configuration, the receiving the PDCCH DMRS may include receiving the PDCCH DMRS from a fourth set of REs in the first set of symbols excluding the third set of symbols, the fourth set of REs having a spacing of y.

In another configuration, the CORESET and the PDCCH of the second RAT may overlap at a set of symbols, the UE may determine a configuration of a mapping of the PDCCH DMRS to a first set of REs with a spacing of y REs within the set of symbols in the CORESET, where the CRS may be mapped to a second set of REs with a spacing of x REs in the PDCCH of the second RAT, where y is equal to n*x and n is an integer greater than or equal to two, and the receiving the PDCCH DMRS may be based on the determined configuration. In such a configuration, the determined configuration may include a mapping of the PDCCH DMRS to a third set of REs with a spacing of n*x REs within the CORESET excluding the set of symbols. In such a configuration, the determined configuration may include a mapping of the PDCCH DMRS to a third set of REs with a spacing of x REs within the CORESET excluding the set of symbols. In such a configuration, the determined configuration may include a mapping of the PDCCH DMRS to a third set of REs with a spacing of z REs within the CORESET excluding the set of symbols, where z is unequal to n*x for n integer greater than or equal to one.

In another configuration, the CORESET may include at least two symbols, and the receiving of the PDCCH DMRS may include receiving a first set of DMRS on a first set of symbols of the at least two symbols and a second set of DMRS on a second set of symbols of the at least two symbols, where the first set of DMRS and the second set of DMRS may be mapped differently.

In another configuration, the CORESET may include a first CORESET including one symbol and a second CORESET including one symbol, where the PDCCH DMRS received on the one symbol of the first CORESET may be quasi-co-located with the PDCCH DMRS received on the one symbol of the second CORESET, and the receiving of the PDCCH DMRS may include receiving a first set of DMRS on a set of symbols of the first CORESET and a second set of DMRS on a set of symbols of the second CORESET, where the first set of DMRS and the second set of DMRS are mapped differently.

The means may be one or more of the components of the apparatus 2402 configured to perform the functions recited by the means. As described supra, the apparatus 2402 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to map PDCCH DMRS of a first RAT to a CORESET based on whether CRS of a second RAT overlaps at least partially with the CORESET; and transmit the PDCCH DMRS mapped to the CORESET.

Aspect 2 is the apparatus of aspect 1, further including a transceiver coupled to the at least one processor.

Aspect 3 is the apparatus of any of aspects 1 and 2, where the at least one processor is further configured to determine that the PDCCH DMRS is configured to be mapped to a first set of REs in a first set of symbols of the CORESET that overlaps at least partially in REs or symbols with the CRS that is configured to be mapped to a second set of REs in a second set of symbols, the first set of symbols and the second set of symbols overlapping at a third set of symbols, where the mapping the PDCCH DMRS includes mapping, based on the determination, the PDCCH DMRS to the first set of REs in the first set of symbols excluding the third set of symbols.

Aspect 4 is the apparatus of any of aspects 1 to 3, where the at least one processor is further configured to map a PDCCH of the first RAT to at least one RE in at least one symbol of the first set of symbols, the at least one RE in the at least one symbol excluding the first set of REs in the third set of symbols.

Aspect 5 is the apparatus of any of aspects 1 to 4, where the first set of REs and the second set of REs overlapping at a third set of REs.

Aspect 6 is the apparatus of any of aspects 1 to 5, where the at least one processor is further configured to map PDCCH of the first RAT to at least one RE in at least one symbol of the first set of symbols, where to map the PDCCH of the first RAT the at least one processor is further configured to map the PDCCH of the first RAT to the first set of REs excluding the third set of REs in the third set of symbols.

Aspect 7 is the apparatus of any of aspects 1 to 6, where to map the PDCCH DMRS the at least one processor is further configured to map the PDCCH DMRS to the first set of REs excluding the third set of REs in the third set of symbols.

Aspect 8 is the apparatus of any of aspects 1 to 7, where the first set of REs have a spacing of x REs, and the second set of REs have a spacing of y REs, where x and y are unequal, where the mapping the PDCCH DMRS includes mapping the PDCCH DMRS to a third set of REs in the third set of symbols, the third set of REs having a spacing of n*y, where n is an integer greater than or equal to two.

Aspect 9 is the apparatus of any of aspects 1 to 8, where to map the PDCCH DMRS the at least one processor is further configured to map the PDCCH DMRS to a fourth set of REs in the first set of symbols excluding the third set of symbols, the fourth set of REs having a spacing of n*y, where n is an integer greater than or equal to two.

Aspect 10 is the apparatus of any of aspects 1 to 9, where to map the PDCCH DMRS the at least one processor is further configured to map the PDCCH DMRS to a fourth set of REs in the first set of symbols excluding the third set of symbols, the fourth set of REs having a spacing of x.

Aspect 11 is the apparatus of any of aspects 1 to 10, where to map the PDCCH DMRS the at least one processor is further configured to map the PDCCH DMRS to a fourth set of REs in the first set of symbols excluding the third set of symbols, the fourth set of REs having a spacing of y.

Aspect 12 is the apparatus of any of aspects 1 to 11, where the CORESET and the PDCCH of the second RAT overlap at a set of symbols, the at least one processor is further configured to determine a configuration of a mapping of the PDCCH DMRS to a first set of REs with a spacing of y REs within the set of symbols in the CORESET, where the CRS are mapped to a second set of REs with a spacing of x REs in the PDCCH of the second RAT, where y is equal to n*x and n is an integer greater than or equal to two, where the mapping the PDCCH DMRS is based on the determined configuration.

Aspect 13 is the apparatus of any of aspects 1 to 12, where the determined configuration includes a mapping of the PDCCH DMRS to a third set of REs with a spacing of n*x REs within the CORESET excluding the set of symbols.

Aspect 14 is the apparatus of any of aspects 1 to 13, where the determined configuration includes a mapping of the PDCCH DMRS to a third set of REs with a spacing of x REs within the CORESET excluding the set of symbols.

Aspect 15 is the apparatus of any of aspects 1 to 14, where the determined configuration includes a mapping of the PDCCH DMRS to a third set of REs with a spacing of z REs within the CORESET excluding the set of symbols, where z is unequal to n*x for n integer greater than or equal to one.

Aspect 16 is the apparatus of any of aspects 1 to 15, where the CORESET is a CORESET #n, where n is greater than or equal to one.

Aspect 17 is the apparatus of any of aspects 1 to 16, where the first RAT is New Radio (NR) 5G and the second RAT is Long Term Evolution (LTE) 4G.

Aspect 18 is the apparatus of any of aspects 1 to 17, where the CORESET includes at least two symbols, and the mapping of the PDCCH DMRS includes a first mapping on a first set of symbols of the at least two symbols and a second mapping on a second set of symbols of the at least two symbols, where the first mapping and the second mapping are different.

Aspect 19 is the apparatus of any of aspects 1 to 18, where the CORESET includes a first CORESET including one symbol and a second CORESET including one symbol, where the transmitted PDCCH DMRS on the one symbol of the first CORESET is quasi-co-located with the transmitted PDCCH DMRS on the one symbol of the second CORESET, and where the mapping of the PDCCH DMRS includes a first mapping on a set of symbols of the first CORESET and a second mapping on a set of symbols of the second CORESET, where the first mapping and the second mapping are different.

Aspect 20 is a method of wireless communication for implementing any of aspects 1 to 19.

Aspect 21 is an apparatus for wireless communication including means for implementing any of aspects 1 to 19.

Aspect 22 is a computer-readable medium storing computer executable code, where the code when executed by a processor causes the processor to implement any of aspects 1 to 19.

Aspect 23 is an apparatus for wireless communication including at least one processor coupled to a memory and configured to receive PDCCH DMRS of a first RAT in a CORESET, where the PDCCH DMRS of the first RAT is mapped based on whether CRS of a second RAT overlaps at least partially with the CORESET; and measure channel condition based on the received PDCCH DMRS.

Aspect 24 is the apparatus of aspect 23, further including a transceiver coupled to the at least one processor.

Aspect 25 is the apparatus of any of aspects 23 and 24, where the at least one processor is further configured to determine that the PDCCH DMRS is configured to be mapped to a first set of resource elements (REs) in a first set of symbols of the CORESET that overlaps at least partially in REs or symbols with the CRS that is configured to be mapped to a second set of REs in a second set of symbols, the first set of symbols and the second set of symbols overlapping at a third set of symbols, where to receive the PDCCH DMRS the at least one processor is further configured to receive, based on the determination, the PDCCH DMRS from the first set of REs in the first set of symbols excluding the third set of symbols.

Aspect 26 is the apparatus of any of aspects 23 to 25, where the at least one processor is further configured to receive PDCCH of the first RAT from at least one RE in at least one symbol of the first set of symbols, the at least one RE in the at least one symbol excluding the first set of REs in the third set of symbols.

Aspect 27 is the apparatus of any of aspects 23 to 26, where the first set of REs and the second set of REs overlapping at a third set of REs.

Aspect 28 is the apparatus of any of aspects 23 to 27, where the at least one processor is further configured to receive PDCCH of the first RAT from at least one RE in at least one symbol of the first set of symbols, where to receive the PDCCH of the first RAT the at least one processor is further configured to receive the PDCCH of the first RAT from the first set of REs excluding the third set of REs in the third set of symbols.

Aspect 29 is the apparatus of any of aspects 23 to 28, where to receive the PDCCH DMRS the at least one processor is further configured to receive the PDCCH DMRS from the first set of REs excluding the third set of REs in the third set of symbols.

Aspect 30 is the apparatus of any of aspects 23 to 29, where the first set of REs have a spacing of x REs, and the second set of REs have a spacing of y REs, where x and y are unequal, where to receive the PDCCH DMRS the at least one processor is further configured to receive the PDCCH DMRS from a third set of REs in the third set of symbols, the third set of REs having a spacing of n*y, where n is an integer greater than or equal to two.

Aspect 31 is the apparatus of any of aspects 23 to 30, where to receive the PDCCH DMRS the at least one processor is further configured to receive the PDCCH DMRS from a fourth set of REs in the first set of symbols excluding the third set of symbols, the fourth set of REs having a spacing of n*y, where n is an integer greater than or equal to two.

Aspect 32 is the apparatus of any of aspects 23 to 31, where to receive the PDCCH DMRS the at least one processor is further configured to receive the PDCCH DMRS from a fourth set of REs in the first set of symbols excluding the third set of symbols, the fourth set of REs having a spacing of x.

Aspect 33 is the apparatus of any of aspects 23 to 32, where to receive the PDCCH DMRS the at least one processor is further configured to receive the PDCCH DMRS from a fourth set of REs in the first set of symbols excluding the third set of symbols, the fourth set of REs having a spacing of y.

Aspect 34 is the apparatus of any of aspects 23 to 33, where the CORESET and the PDCCH of the second RAT overlap at a set of symbols, the at least one processor is further configured to determine a configuration of a mapping of the PDCCH DMRS to a first set of resource elements (REs) with a spacing of y REs within the set of symbols in the CORESET, where the CRS are mapped to a second set of REs with a spacing of x REs in the PDCCH of the second RAT, where y is equal to n*x and n is an integer greater than or equal to two, where to receive the PDCCH DMRS is based on the determined configuration.

Aspect 35 is the apparatus of any of aspects 23 to 34, where the determined configuration includes a mapping of the PDCCH DMRS to a third set of REs with a spacing of n*x REs within the CORESET excluding the set of symbols.

Aspect 36 is the apparatus of any of aspects 23 to 35, where the determined configuration includes a mapping of the PDCCH DMRS to a third set of REs with a spacing of x REs within the CORESET excluding the set of symbols.

Aspect 37 is the apparatus of any of aspects 23 to 36, where the determined configuration includes a mapping of the PDCCH DMRS to a third set of REs with a spacing of z REs within the CORESET excluding the set of symbols, where z is unequal to n*x for n integer greater than or equal to one.

Aspect 38 is the apparatus of any of aspects 23 to 37, where the CORESET is a CORESET #n, where n is greater than or equal to one.

Aspect 39 is the apparatus of any of aspects 23 to 38, where the first RAT is NR 5G and the second RAT is LTE 4G.

Aspect 40 is the apparatus of any of aspects 23 to 39, where the CORESET includes at least two symbols, and the receiving of the PDCCH DMRS includes receiving a first set of DMRS on a first set of symbols of the at least two symbols and a second set of DMRS on a second set of symbols of the at least two symbols, where the first set of DMRS and the second set of DMRS are mapped differently.

Aspect 41 is the apparatus of any of aspects 23 to 40, where the CORESET includes a first CORESET including one symbol and a second CORESET including one symbol, where the PDCCH DMRS received on the one symbol of the first CORESET is quasi-co-located with the PDCCH DMRS received on the one symbol of the second CORESET, and where the receiving of the PDCCH DMRS includes a receiving a first set of DMRS on a set of symbols of the first CORESET and a second set of DMRS on a set of symbols of the second CORESET, where the first set of DMRS and the second set of DMRS are mapped differently.

Aspect 42 is a method of wireless communication for implementing any of aspects 23 to 41.

Aspect 43 is an apparatus for wireless communication including means for implementing any of aspects 23 to 41.

Aspect 44 is a computer-readable medium storing computer executable code, where the code when executed by a processor causes the processor to implement any of aspects 23 to 41.

What is claimed is:

1. An apparatus for wireless communication at a base station, comprising:
 a memory; and
 at least one processor coupled to the memory and configured to:
  determine that demodulation reference signals (DMRS) of a first radio access technology (RAT) are configured to be mapped to a first set of resource elements (REs) in a first set of symbols of a control resource set (CORESET) that overlap at least partially in REs or symbols with cell-specific reference signals (CRS) of a second RAT that are configured to be mapped to a second set of REs in a second set of symbols, the first set of symbols and the second set of symbols overlapping at a third set of symbols;
  map, based on the determination, the DMRS to the first set of REs in the first set of symbols excluding the third set of symbols; and
  transmit the DMRS mapped to the CORESET.

2. The apparatus of claim 1, further comprising a transceiver coupled to the at least one processor.

3. The apparatus of claim 1, wherein the first set of REs and the second set of REs overlap at a third set of REs.

4. The apparatus of claim 3, wherein the at least one processor is further configured to map a physical downlink control channel (PDCCH) of the first RAT to at least one RE in at least one symbol of the first set of symbols, wherein to map the PDCCH of the first RAT the at least one processor is further configured to map the PDCCH of the first RAT to the first set of REs excluding the third set of REs in the third set of symbols.

5. The apparatus of claim 3, wherein to map the DMRS the at least one processor is further configured to map the DMRS to the first set of REs excluding the third set of REs in the third set of symbols.

6. The apparatus of claim 1, wherein the first set of REs have a spacing of x REs, and the second set of REs have a spacing of y REs, where x and y are unequal, wherein to map the DMRS the at least one processor is further configured to map the DMRS to a third set of REs in the third set of symbols, the third set of REs having a spacing of n*y, where n is an integer greater than or equal to two.

7. The apparatus of claim 1, wherein the CORESET and a physical downlink control channel (PDCCH) of the second RAT overlap at a set of symbols, the at least one processor is further configured to determine a configuration of a mapping of the DMRS to the first set of REs with a spacing of y REs within the set of symbols in the CORESET, wherein the CRS are mapped to the second set of REs with a spacing of x REs in the PDCCH of the second RAT, wherein y is equal to n*x and n is an integer greater than or equal to two, wherein the mapping of the DMRS is based on the determined configuration.

8. The apparatus of claim 1, wherein the CORESET is a CORESET #n, where n is greater than or equal to one.

9. The apparatus of claim 1, wherein the CORESET comprises at least two symbols, and the mapping of the DMRS comprises a first mapping on the first set of symbols of the at least two symbols and a second mapping on the second set of symbols of the at least two symbols, where the first mapping and the second mapping are different.

10. The apparatus of claim 1, wherein the CORESET comprises a first CORESET including one symbol and a second CORESET including one symbol, wherein the transmitted DMRS on the one symbol of the first CORESET is quasi-co-located with the transmitted DMRS on the one symbol of the second CORESET, and wherein the mapping of the DMRS comprises a first mapping on a set of symbols of the first CORESET and a second mapping on a set of symbols of the second CORESET, where the first mapping and the second mapping are different.

11. The apparatus of claim 1, wherein the DMRS of the first RAT is mapped to the first set of REs excluding a third set of REs when the CRS of the second RAT is mapped to the second set of REs that overlap with the first set of REs at the third set of REs.

12. A method of wireless communication at a base station (BS), comprising:
    determining that demodulation reference signals (DMRS) of a first radio access technology (RAT) are configured to be mapped to a first set of resource elements (REs) in a first set of symbols of a control resource set (CORESET) that overlap at least partially in REs or symbols with cell-specific reference signals (CRS) of a second RAT that are configured to be mapped to a second set of REs in a second set of symbols, the first set of symbols and the second set of symbols overlapping at a third set of symbols;
    mapping, based on the determination, the DMRS to the first set of REs in the first set of symbols excluding the third set of symbols; and
    transmitting the DMRS mapped to the CORESET.

13. The method of claim 12, wherein the first set of REs and the second set of REs overlap at a third set of REs.

14. The method of claim 13, further comprising mapping a physical downlink control channel (PDCCH) of the first RAT to at least one RE in at least one symbol of the first set of symbols, wherein the mapping the PDCCH of the first RAT comprises mapping the PDCCH of the first RAT to the first set of REs excluding the third set of REs in the third set of symbols.

15. The method of claim 13, wherein the mapping the DMRS comprises mapping the DMRS to the first set of REs excluding the third set of REs in the third set of symbols.

16. The method of claim 12, wherein the first set of REs have a spacing of x REs, and the second set of REs have a spacing of y REs, where x and y are unequal, wherein the mapping the DMRS comprises mapping the DMRS to a third set of REs in the third set of symbols, the third set of REs having a spacing of n*y, where n is an integer greater than or equal to two.

17. The method of claim 12, wherein the CORESET and a physical downlink control channel (PDCCH) of the second RAT overlap at a set of symbols, the method further comprising determining a configuration of a mapping of the DMRS to the first set of REs with a spacing of y REs within the set of symbols in the CORESET, wherein the CRS are mapped to the second set of REs with a spacing of x REs in the PDCCH of the second RAT, wherein y is equal to n*x and n is an integer greater than or equal to two, wherein the mapping the DMRS is based on the determined configuration.

18. The method of claim 12, wherein the CORESET is a CORESET #n, where n is greater than or equal to one.

19. The method of claim 12, wherein the CORESET comprises at least two symbols, and the mapping of the DMRS comprises a first mapping on the first set of symbols of the at least two symbols and a second mapping on the second set of symbols of the at least two symbols, where the first mapping and the second mapping are different.

20. The method of claim 12, wherein the CORESET comprises a first CORESET including one symbol and a second CORESET including one symbol, wherein the transmitted DMRS on the one symbol of the first CORESET is quasi-co-located with the transmitted DMRS on the one symbol of the second CORESET, and wherein the mapping of the DMRS comprises a first mapping on a set of symbols of the first CORESET and a second mapping on a set of symbols of the second CORESET, where the first mapping and the second mapping are different.

21. An apparatus for wireless communication at a user equipment (UE), comprising:
    a memory; and
    at least one processor coupled to the memory and configured to:
        receive demodulation reference signals (DMRS) of a first radio access technology (RAT) in a first set of resource elements (REs) of a control resource set (CORESET), wherein the DMRS of the first RAT is mapped based on whether cell-specific reference signals (CRS) of a second RAT mapped to a second set of REs overlap at least partially in REs or symbols with the DMRS within the CORESET, wherein the CORESET and a physical downlink control channel (PDCCH) of the second RAT overlap at a set of symbols, the at least one processor being further configured to determine a configuration of a mapping of the DMRS to the first set of REs with a spacing of y REs within the set of symbols in the CORESET, wherein the CRS are mapped to the second set of REs with a spacing of x REs in the PDCCH of the second RAT, wherein y is equal to n*x and n is an integer greater than or equal to two, wherein the reception of the DMRS is based on the determined configuration; and measure a channel condition based on the received DMRS.

22. The apparatus of claim 21, further comprising a transceiver coupled to the at least one processor.

23. An apparatus for wireless communication at a user equipment (UE), comprising:
a memory; and
at least one processor coupled to the memory and configured to:
determine that demodulation reference signals (DMRS) of a first radio access technology (RAT) are configured to be mapped to a first set of resource elements (REs) in a first set of symbols of a control resource set (CORESET) that overlap at least partially in REs or symbols with cell-specific reference signals (CRS) of a second RAT that is configured to be mapped to a second set of REs in a second set of symbols, the first set of symbols and the second set of symbols overlapping at a third set of symbols;
receive, based on the determination, the DMRS from the first set of REs in the first set of symbols excluding the third set of symbols; and
measure a channel condition based on the received DMRS.

24. The apparatus of claim 23, wherein the first set of REs and the second set of REs overlap at a third set of REs, the at least one processor is further configured to comprising receive a physical downlink control channel (PDCCH) of the first RAT from at least one RE in at least one symbol of the first set of symbols, wherein to receive the PDCCH of the first RAT the at least one processor is further configured to receive the PDCCH of the first RAT from the first set of REs excluding the third set of REs in the third set of symbols.

25. A method of wireless communication at a user equipment (UE), comprising:
determining that demodulation reference signals (DMRS) of a first radio access technology (RAT) are configured to be mapped to a first set of resource elements (REs) in a first set of symbols of a control resource set (CORESET) that overlap at least partially in REs or symbols with cell-specific reference signals (CRS) of a second RAT that is configured to be mapped to a second set of REs in a second set of symbols, the first set of symbols and the second set of symbols overlapping at a third set of symbols;
receiving, based on the determination, the DMRS from the first set of REs in the first set of symbols excluding the third set of symbols; and
measuring a channel condition based on the received DMRS.

26. The method of claim 25, wherein the first set of REs and the second set of REs overlap at a third set of REs, and wherein the receiving the DMRS comprises receiving the DMRS from the first set of REs excluding the third set of REs in the third set of symbols.

27. The method of claim 25, wherein the CORESET and a physical downlink control channel (PDCCH) of the second RAT overlap at a set of symbols, the method further comprising determining a configuration of a mapping of the DMRS to the first set of REs with a spacing of y REs within the set of symbols in the CORESET, wherein the CRS are mapped to the second set of REs with a spacing of x REs in the PDCCH of the second RAT, wherein y is equal to n*x and n is an integer greater than or equal to two, wherein the receiving the DMRS is based on the determined configuration.

28. The method of claim 25, wherein the first set of REs have a spacing of x REs, and the second set of REs have a spacing of y REs, where x and y are unequal, wherein the receiving the DMRS comprises receiving the DMRS from a third set of REs in the third set of symbols, the third set of REs having a spacing of n*y, where n is an integer greater than or equal to two.

* * * * *